US011497178B2

(12) United States Patent
Taylor, Jr. et al.

(10) Patent No.: US 11,497,178 B2
(45) Date of Patent: Nov. 15, 2022

(54) DRIP IRRIGATION EMITTER WITH OPTIMIZED CLOG RESISTANCE

(71) Applicant: The Toro Company, Bloomington, MN (US)

(72) Inventors: William C. Taylor, Jr., El Cajon, CA (US); Daniel Trinidad, Escondido, CA (US); David S. Martin, Bonita, CA (US); Michael R. Knighton, Lakeside, CA (US)

(73) Assignee: The Toro Company, Bloomington, MN (US)

(*) Notice: Subject to any disclaimer, the term of this patent is extended or adjusted under 35 U.S.C. 154(b) by 0 days.

(21) Appl. No.: 16/890,702

(22) Filed: Jun. 2, 2020

(65) Prior Publication Data

US 2020/0390043 A1 Dec. 17, 2020

Related U.S. Application Data

(60) Provisional application No. 62/951,419, filed on Dec. 20, 2019, provisional application No. 62/861,411, filed on Jun. 14, 2019, provisional application No. 62/861,443, filed on Jun. 14, 2019.

(51) Int. Cl.
*A01G 25/02* (2006.01)
(52) U.S. Cl.
CPC .................................. *A01G 25/023* (2013.01)
(58) Field of Classification Search
CPC ....... A01G 25/023; A01G 25/02; Y02A 40/22
See application file for complete search history.

(56) References Cited

U.S. PATENT DOCUMENTS

| 4,572,756 A | 2/1986 | Chapin |
| 4,642,152 A | 2/1987 | Chapin |
| 5,688,072 A | 11/1997 | Meyer et al. |
| 5,829,686 A | 11/1998 | Cohen |

(Continued)

FOREIGN PATENT DOCUMENTS

| CN | 201957532 U | 9/2011 |
| CN | 205912610 U | 2/2017 |

(Continued)

OTHER PUBLICATIONS

Exxtreme Tape, product flyer accessed at https://www.irritec.com/exxtreme-tape-en/ on Dec. 14, 2018, 2 pages.

*Primary Examiner* — Qingzhang Zhou
(74) *Attorney, Agent, or Firm* — Dicke, Billig & Czaja, PLLC

(57) ABSTRACT

An emitter includes at least one of: an inlet section including inlet members forming first and second openings having different sizes; a pressure reducing section including a first pressure reducing portion having a first pressure reducing configuration and a second pressure reducing portion having a second pressure reducing configuration being different; the pressure reducing section including at least one nonlinear rail portion; a pressure responsive section including at least one nonlinear rail portion; or a base including a first base portion having a first base configuration and a second base portion having a second base configuration being different, wherein at least one of the first base portion or the second base portion is positioned in one or more of the inlet section, the pressure reducing section, or an outlet section.

23 Claims, 27 Drawing Sheets

(56) References Cited

U.S. PATENT DOCUMENTS

| | | |
|---|---|---|
| 5,957,391 A | 9/1999 | DeFrank et al. |
| 6,116,523 A | 9/2000 | Cabahug et al. |
| 6,308,902 B1 | 10/2001 | Huntley |
| 6,371,390 B1 | 4/2002 | Cohen |
| 6,382,530 B1 | 5/2002 | Perkins |
| 6,403,013 B1 | 6/2002 | Man |
| 6,561,443 B2 | 5/2003 | Delmer |
| 6,736,337 B2 | 5/2004 | Vildibill et al. |
| 6,817,548 B2 | 11/2004 | Krauth |
| 6,886,761 B2 | 5/2005 | Cohen |
| 6,945,476 B2 | 9/2005 | Giuffre |
| 7,108,205 B1 | 9/2006 | Hashimshony et al. |
| 7,735,758 B2 * | 6/2010 | Cohen ............... A01G 25/023 239/533.1 |
| 8,141,589 B2 | 3/2012 | Socolsky |
| 8,317,111 B2 | 11/2012 | Cohen |
| 8,998,113 B2 | 4/2015 | Keren |
| 9,380,749 B2 | 7/2016 | Akritanakis |
| 9,485,923 B2 | 11/2016 | Ensworth et al. |
| 9,894,850 B2 | 2/2018 | Kidachi |
| 9,992,939 B2 | 6/2018 | Kidachi |
| 10,219,452 B2 | 3/2019 | Kidachi |
| 2002/0113147 A1 | 8/2002 | Huntley |
| 2003/0089803 A1 | 5/2003 | Huntley |
| 2003/0150940 A1 | 8/2003 | Vildibill et al. |
| 2008/0105768 A1 | 5/2008 | Kertscher |
| 2009/0173811 A1 | 7/2009 | Gorney et al. |
| 2015/0090816 A1 | 4/2015 | Akritanakis |
| 2015/0150199 A1 | 6/2015 | Kidachi |
| 2015/0296723 A1 | 10/2015 | Jain et al. |
| 2016/0227716 A1 | 8/2016 | Kidachi |
| 2016/0262319 A1 | 9/2016 | Defrank et al. |
| 2016/0278311 A1 | 9/2016 | Kidachi |
| 2016/0295815 A1 * | 10/2016 | Defrank ............... F16L 11/12 |
| 2018/0213732 A1 | 8/2018 | Ensworth et al. |
| 2018/0220601 A1 | 8/2018 | Loebinger |
| 2018/0271039 A1 | 9/2018 | Morikoshi |

FOREIGN PATENT DOCUMENTS

| | | |
|---|---|---|
| CN | 206181986 U | 5/2017 |
| EP | 0710155 | 9/1996 |
| EP | 0538242 B1 | 11/1998 |
| EP | 1929859 B1 | 6/2008 |
| EP | 1951438 | 8/2008 |
| EP | 1472005 B1 | 5/2013 |
| EP | 2594339 A1 | 5/2013 |
| EP | 2764768 A1 | 8/2014 |
| EP | 2856861 A1 | 4/2015 |
| EP | 3039961 A1 | 7/2016 |
| EP | 3050428 A1 | 8/2016 |
| EP | 3075235 A1 | 10/2016 |
| EP | 3075237 A1 | 10/2016 |
| EP | 3127424 A1 | 2/2017 |
| EP | 3357329 A1 | 8/2018 |
| ES | 2363529 T3 | 8/2011 |
| ES | 2417015 T3 | 8/2013 |
| KR | 100756579 B1 | 9/2007 |
| WO | 9503130 | 2/1995 |
| WO | 9850167 | 11/1998 |
| WO | 0030433 A1 | 6/2000 |
| WO | 0204130 A1 | 1/2002 |
| WO | 0215670 | 2/2002 |
| WO | 0228543 A1 | 4/2002 |
| WO | 03066228 | 8/2003 |
| WO | 2007052272 | 5/2007 |
| WO | 2007052272 A2 | 5/2007 |
| WO | 2008035335 A2 | 3/2008 |
| WO | 2015075738 A2 | 5/2015 |
| WO | 2015075740 A2 | 5/2015 |

* cited by examiner

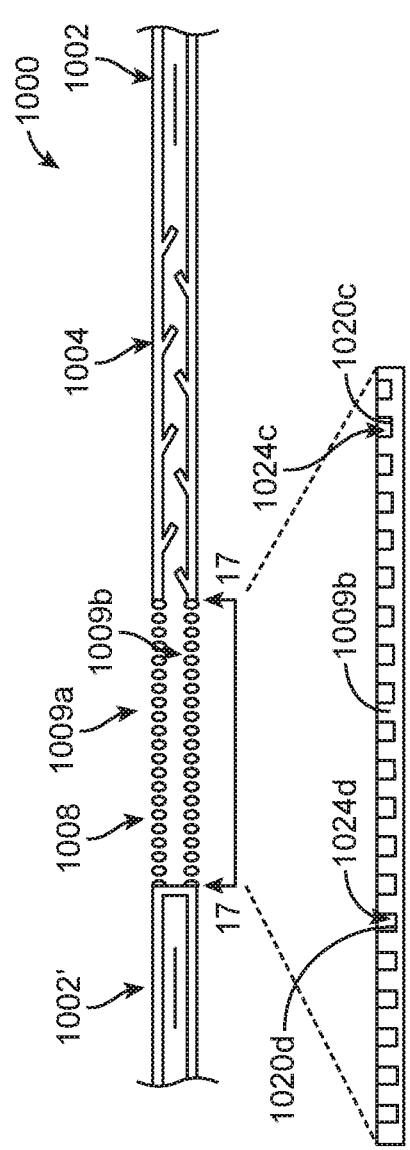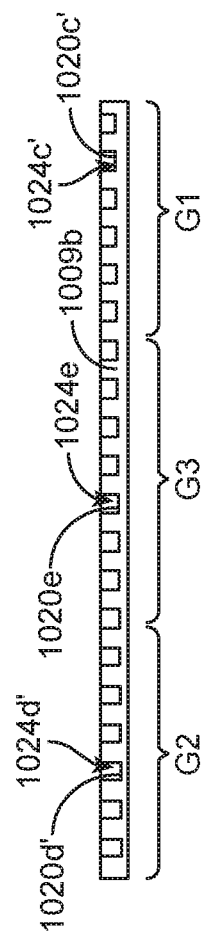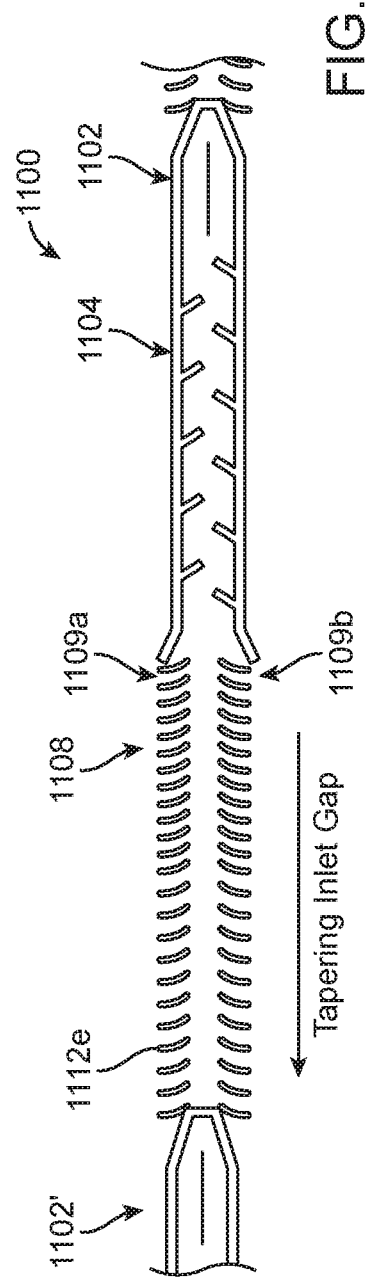

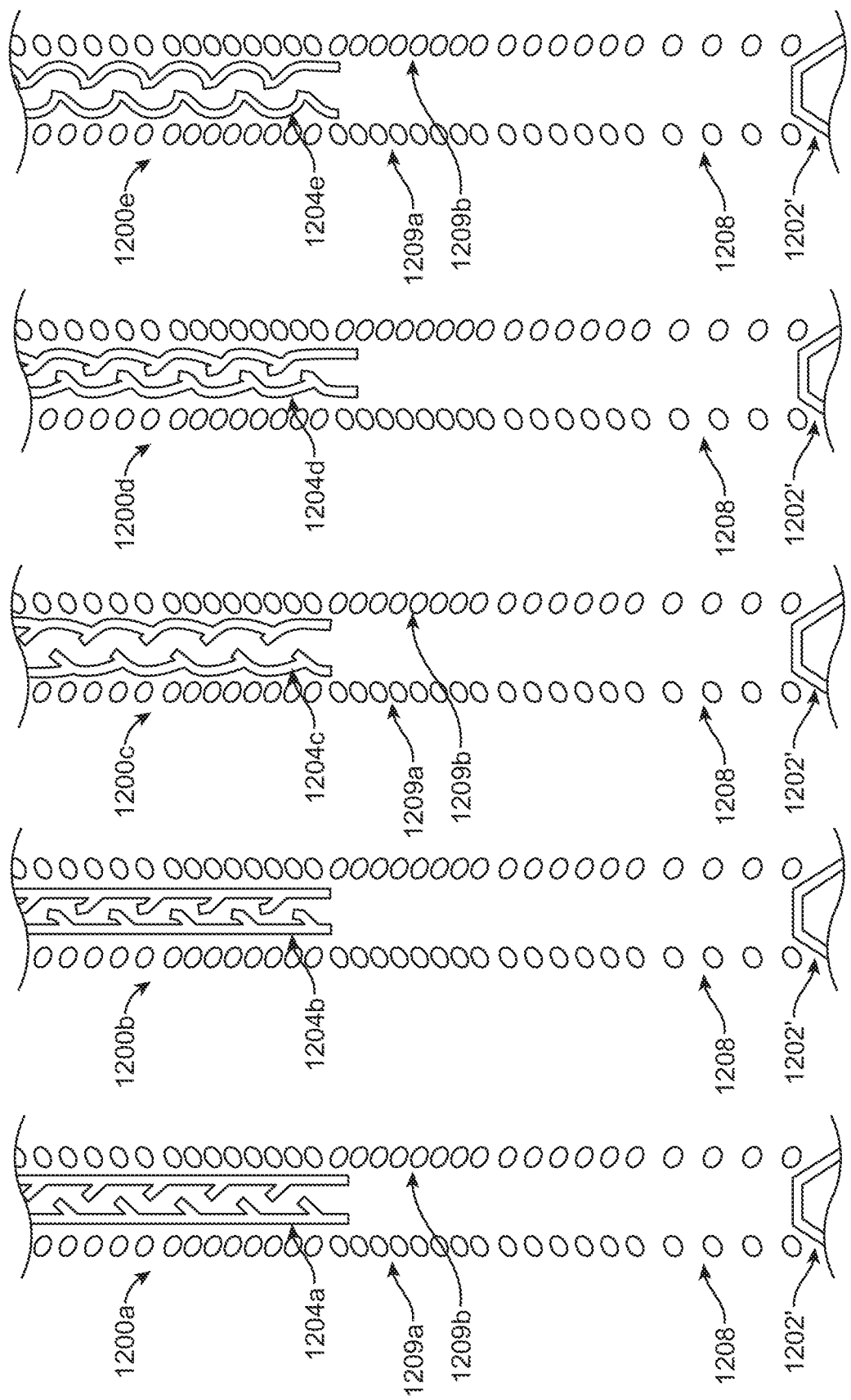

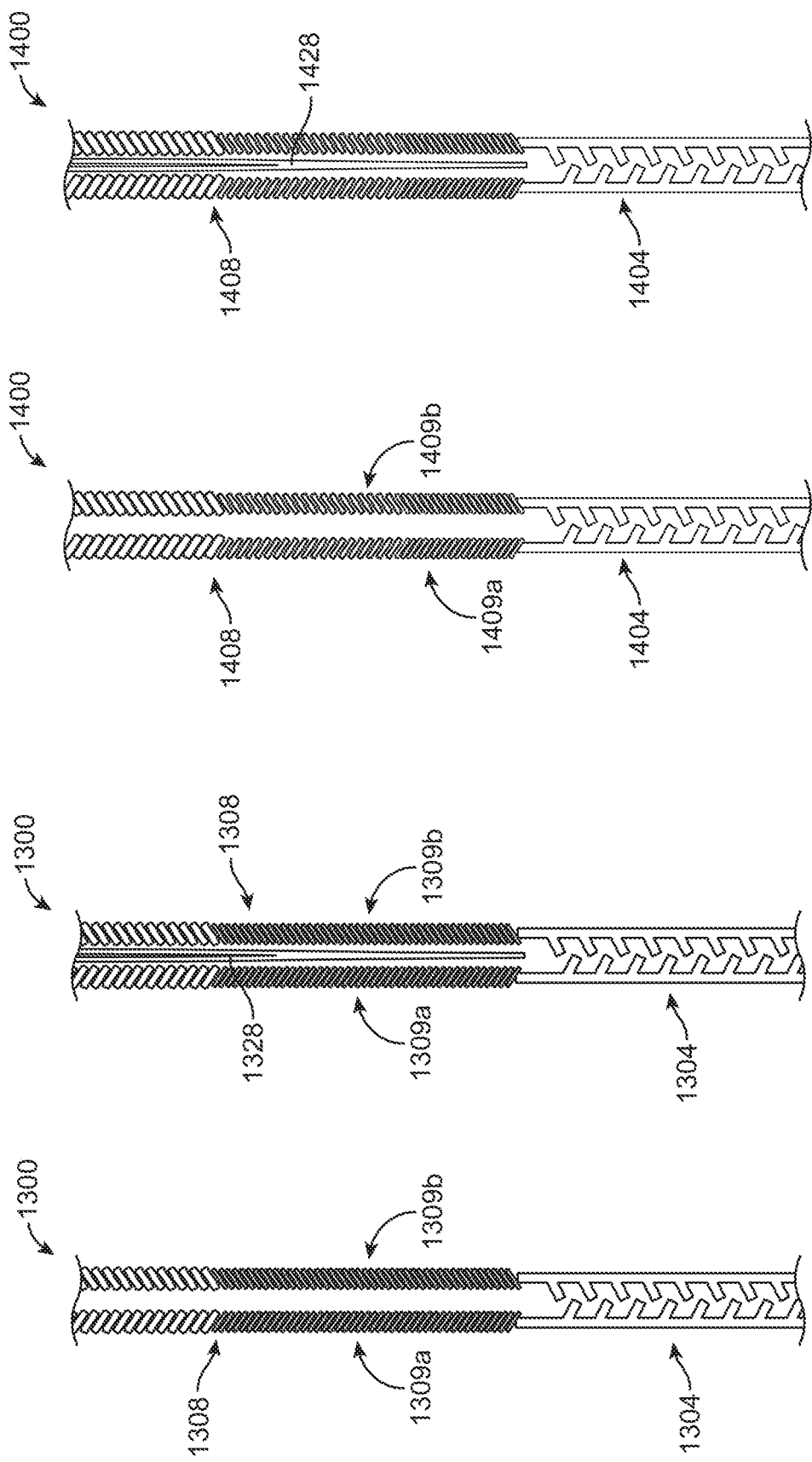

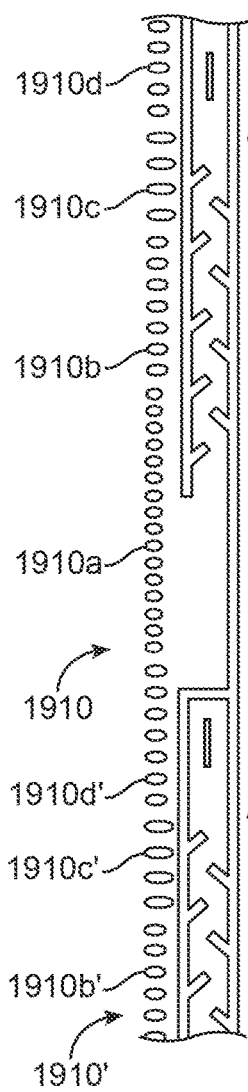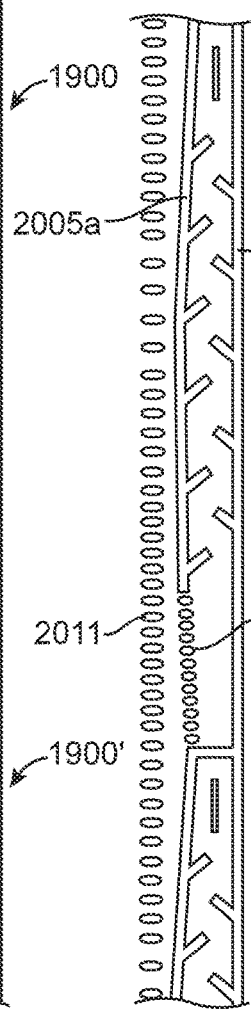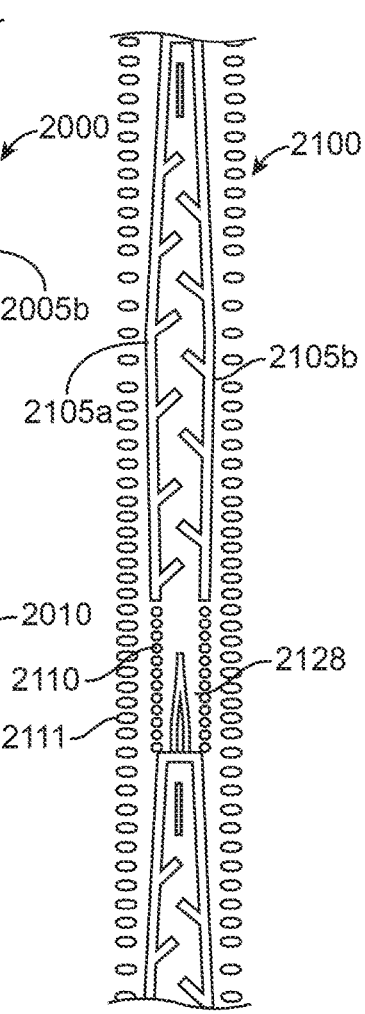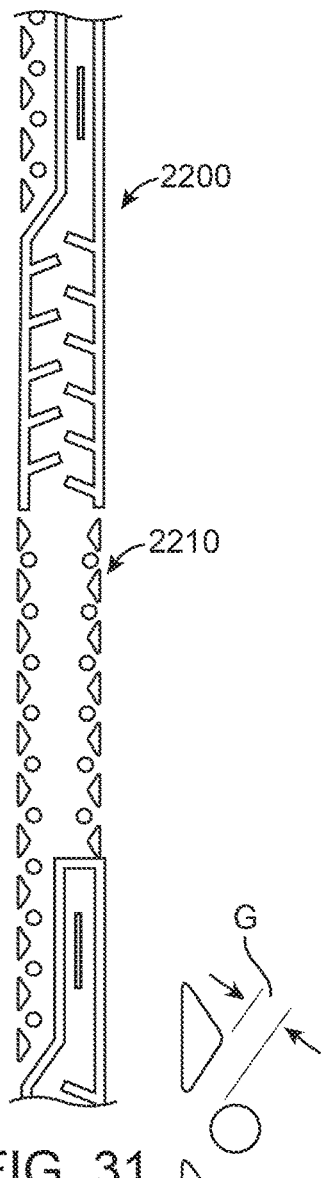
FIG. 28　　FIG. 29　　FIG. 30　　FIG. 31
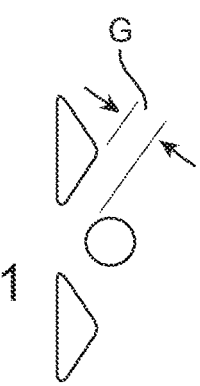
FIG. 31A

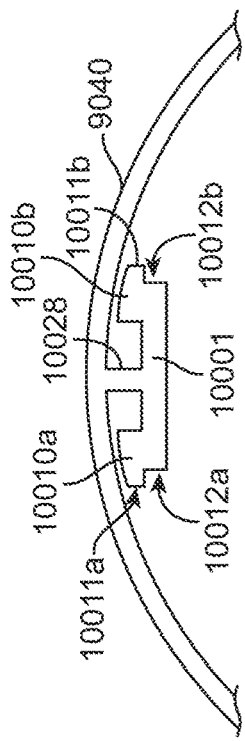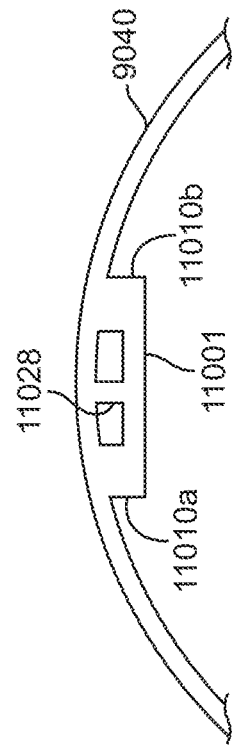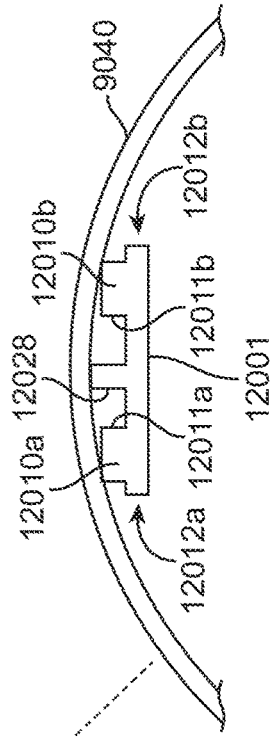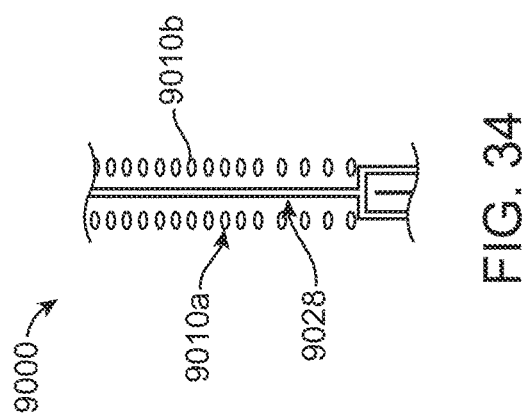

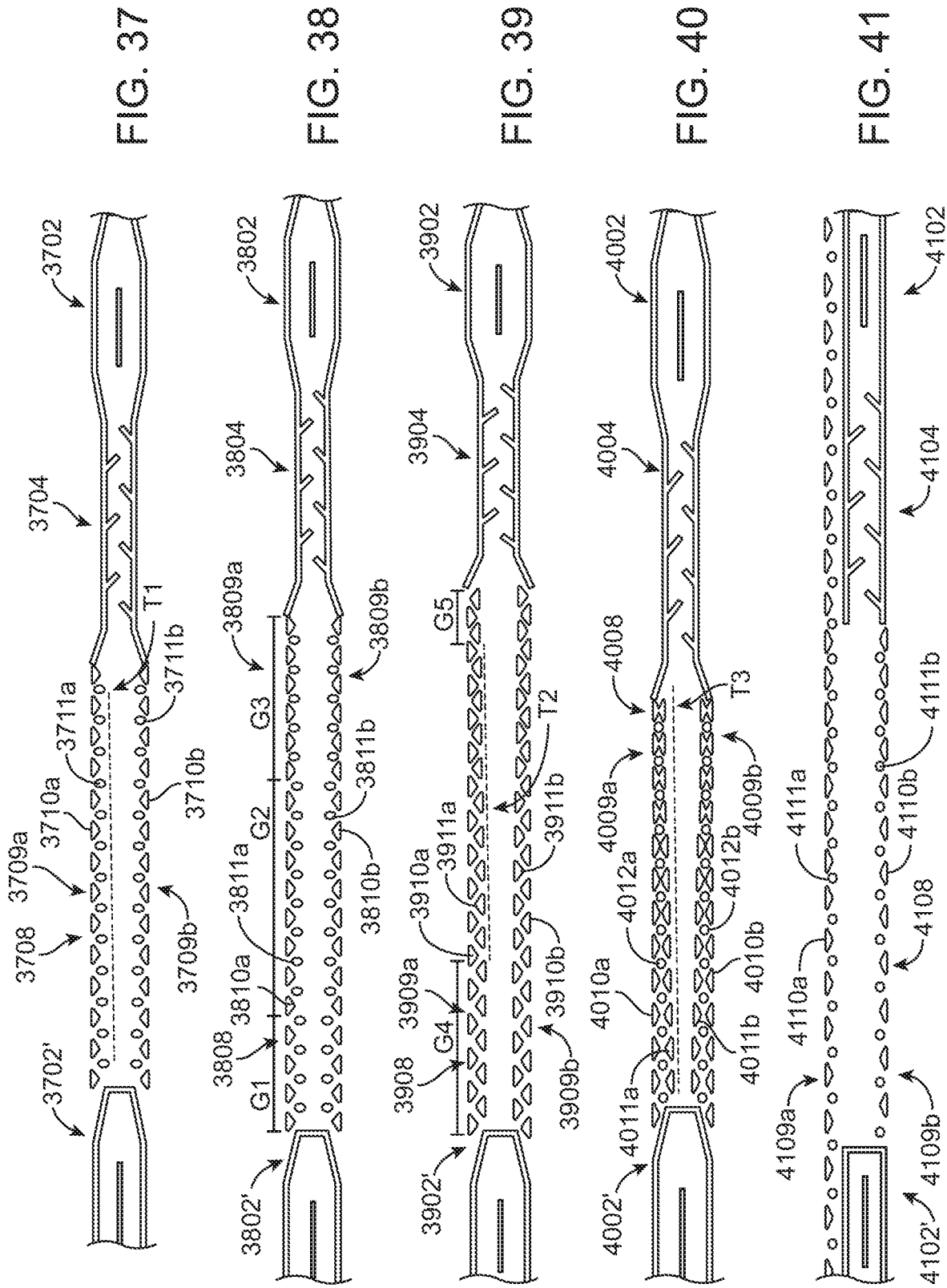

DRIP IRRIGATION EMITTER WITH OPTIMIZED CLOG RESISTANCE

CROSS-REFERENCE TO RELATED APPLICATIONS

This application claims the benefit of U.S. Provisional Application Ser. No. 62/861,411, filed Jun. 14, 2019; U.S. Provisional Application Ser. No. 62/861,443, filed Jun. 14, 2019; and U.S. Provisional Application Ser. No. 62/951,419, filed Dec. 20, 2019; which are incorporated by reference in their entirety herein.

BACKGROUND

Drip irrigation hoses or tapes, including emitters, are commonly used in agricultural irrigation where the water quality is poor. The emitters clog when small particles in the water get trapped in the inlet portions of the emitters, and the hoses or tapes become dysfunctional until they are flushed or replaced, which is time consuming. The terms hose and tape may be used interchangeably herein.

For the reasons stated above and for other reasons stated below, which will become apparent to those skilled in the art upon reading and understanding the present specification, a need exists for drip irrigation hoses that do not easily clog.

SUMMARY

The above-mentioned problems associated with prior devices are addressed by embodiments of the disclosure and will be understood by reading and understanding the present specification. The following summary is made by way of example and not by way of limitation.

In one embodiment, an emitter for use with a drip irrigation tape, the drip irrigation tape having a tape wall, at least a portion of the tape wall defining a tape flow path and a tape outlet, comprises an outlet section, a pressure reducing section, and an inlet section. The outlet section is in fluid communication with the tape outlet, the pressure reducing section is in fluid communication with the outlet section, and the inlet section is in fluid communication with the pressure reducing section and the tape flow path. The outlet section, the pressure reducing section, and the inlet section extend from a base toward the tape wall. The outlet section, the pressure reducing section, the inlet section, the base, and a portion of the tape wall define an emitter flow path. The emitter includes at least one selected from the group consisting of:
  the inlet section including a plurality of inlet members having a proximal end proximate the pressure reducing section and a distal end, the plurality of inlet members forming at least first and second inlet gaps including at least first and second openings having different sizes;
  the pressure reducing section including at least first and second pressure reducing portions, the first pressure reducing portion having a first pressure reducing configuration with at least a first resistance feature and the second pressure reducing portion having a second pressure reducing configuration with at least a second resistance feature, the first and second pressure reducing configurations being different;
  the pressure reducing section including at least one non-linear rail portion;
  a pressure responsive section including at least one non-linear rail portion; and
  the base including a first base portion and a second base portion, the first base portion having a first base configuration and the second base portion having a second base configuration, the first and second base configurations being different, wherein at least one of the first base portion or the second base portion is positioned in one or more of the inlet section, the pressure reducing section, or the outlet section.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. In accordance with common practice, the various described features are not drawn to scale but are drawn to emphasize specific features relevant to the present disclosure. Reference characters denote like elements throughout the Figures and the text.

FIG. 17 is a schematic view of a portion of another embodiment emitter constructed in accordance with the principles of the present invention;

FIG. 17A is a side view of an embodiment of the emitter taken along the lines 17-17 in FIG. 17;

FIG. 17B is a side view of another embodiment of the emitter taken along the lines 17-17 in FIG. 17;

FIG. 18 is a schematic view of a portion of another embodiment emitter constructed in accordance with the principles of the present invention;

FIG. 19A is a schematic view of a portion of another embodiment emitter constructed in accordance with the principles of the present invention;

FIG. 19B is a schematic view of the portion of the emitter shown in FIG. 19A with another embodiment pressure reducing section;

FIG. 19C is a schematic view of the portion of the emitter shown in FIG. 19A with another embodiment pressure reducing section;

FIG. 19D is a schematic view of the portion of the emitter shown in FIG. 19A with another embodiment pressure reducing section;

FIG. 19E is a schematic view of the portion of the emitter shown in FIG. 19A with another embodiment pressure reducing section;

FIG. 22A is a schematic view of a portion of another embodiment emitter constructed in accordance with the principles of the present invention;

FIG. 22B is a schematic view of the portion of the emitter shown in FIG. 22A with an optional guide member;

FIG. 23A is a schematic view of a portion of another embodiment emitter constructed in accordance with the principles of the present invention; and FIG. 23B is a schematic view of the portion of the emitter shown in FIG. 23A with an optional guide member;

FIG. 28 is a schematic view of a portion of another embodiment emitter constructed in accordance with the principles of the present invention;

FIG. 29 is a schematic view of a portion of another embodiment emitter constructed in accordance with the principles of the present invention;

FIG. 30 is a schematic view of a portion of another embodiment emitter constructed in accordance with the principles of the present invention;

FIG. 31 is a schematic view of a portion of another embodiment emitter constructed in accordance with the principles of the present invention;

FIG. 31A is a schematic view of a portion of an inlet portion of the emitter shown in FIG. 31;

FIG. 34 is a schematic view of a portion of another embodiment emitter constructed in accordance with the principles of the present invention;

FIG. 35 is an end view of a hose to which the emitter shown in FIG. 34 is connected to form an irrigation hose;

FIG. 35A is an end view of another embodiment emitter that could be substituted for the emitter shown in FIG. 35;

FIG. 35B is an end view of another embodiment emitter that could be substituted for the emitter shown in FIG. 35;

FIG. 35C is an end view of another embodiment emitter that could be substituted for the emitter shown in FIG. 35;

FIG. 37 is a schematic view of a portion of another embodiment emitter constructed in accordance with the principles of the present invention;

FIG. 38 is a schematic view of a portion of another embodiment emitter constructed in accordance with the principles of the present invention;

FIG. 39 is a schematic view of a portion of another embodiment emitter constructed in accordance with the principles of the present invention;

FIG. 40 is a schematic view of a portion of another embodiment emitter constructed in accordance with the principles of the present invention;

FIG. 41 is a schematic view of a portion of another embodiment emitter constructed in accordance with the principles of the present invention;

DETAILED DESCRIPTION

In the following detailed description, reference is made to the accompanying drawings, which form a part hereof, and in which is shown by way of illustration embodiments in which the disclosure may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that other embodiments may be utilized and mechanical changes may be made without departing from the spirit and scope of the present disclosure. The following detailed description is, therefore, not to be taken in a limiting sense.

It is also to be understood that the phrases "at least one of A and B", "at least one of A or B" and the like should be understood to mean "only A, only B, or both A and B".

Figure 1:
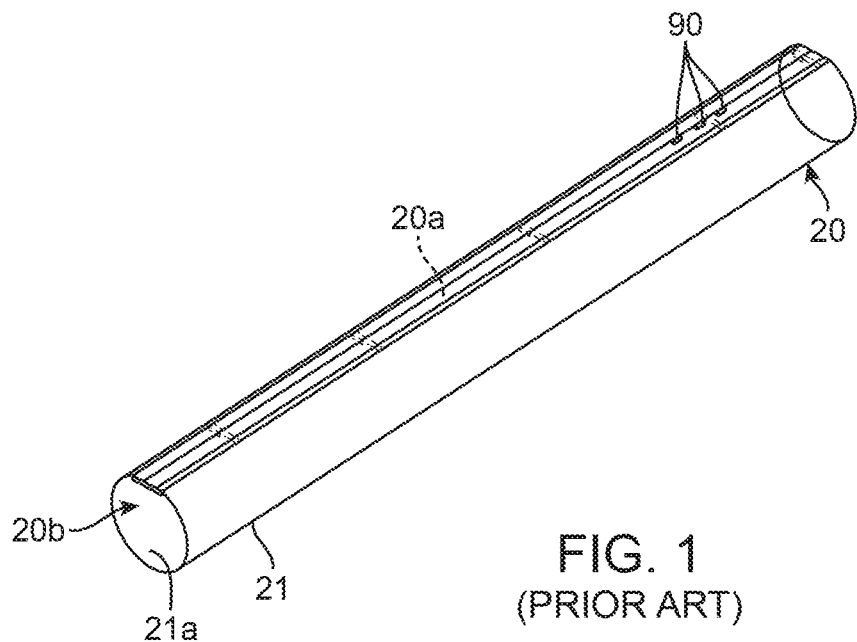
FIG. 1 is a perspective view of a prior art irrigation hose including an emitter operatively connected to a hose.
Figure 2:
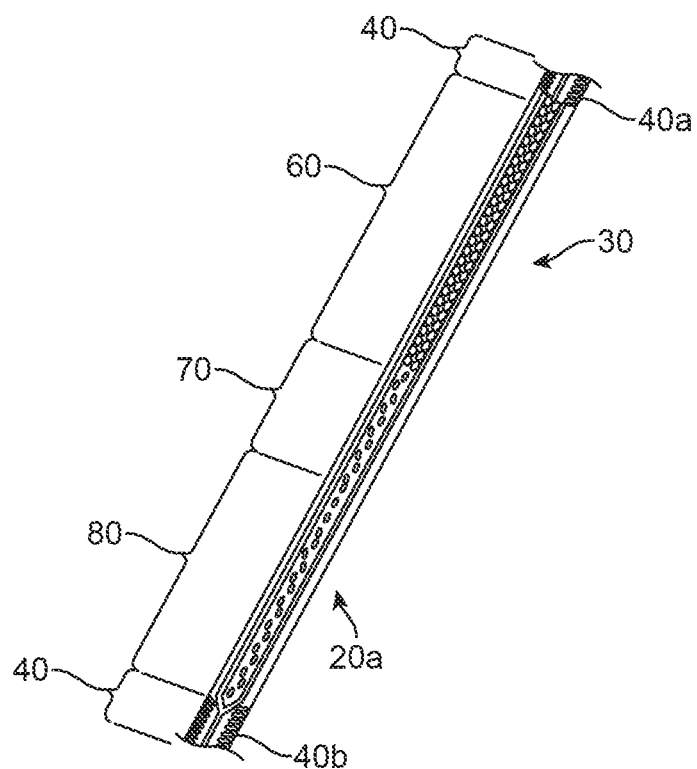
FIG. 2 is a perspective view of the emitter shown in FIG. 1.

Example prior art emitters are shown in FIGS. 1-4. One example prior art emitter 20a is shown in FIG. 2 and the emitter 20a is shown operatively connected to a hose or tape to form an irrigation hose or tape 20 in FIG. 1. An inner surface 21a of a wall 21 of the hose and the outer surface of the emitter 20a form the hose or tape flow path 20b. The emitter 20a may be part of a continuous elastomeric strip member 30 including a plurality of emitters 20a, and each emitter includes an inlet section 40, a pressure reducing section 60, an optional pressure responsive section 70, and an outlet section 80, which with a portion of the hose form the emitter flow path. Portions of two inlet sections 40a and 40b are shown in FIG. 2. The portion of the hose proximate the outlet section 80 includes exit orifices 90 to dispense out of the hose. This example is disclosed in U.S. Pat. No. 6,736,337, which is incorporated herein by reference. Other example prior art emitters utilize non-elastic strip members.

Figure 3:
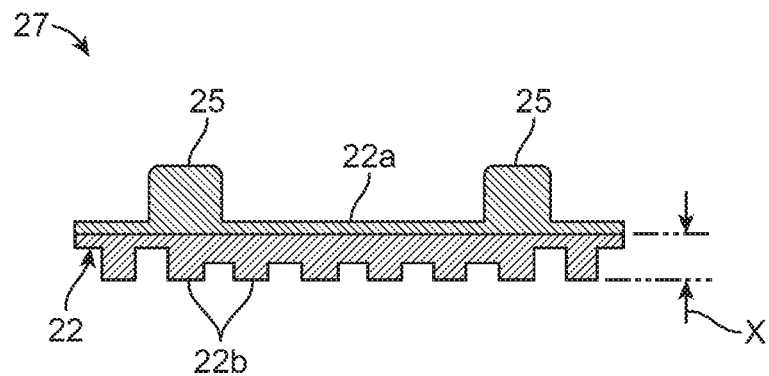
FIG. 3 is a cross section view of a prior art emitter.
Figure 4:
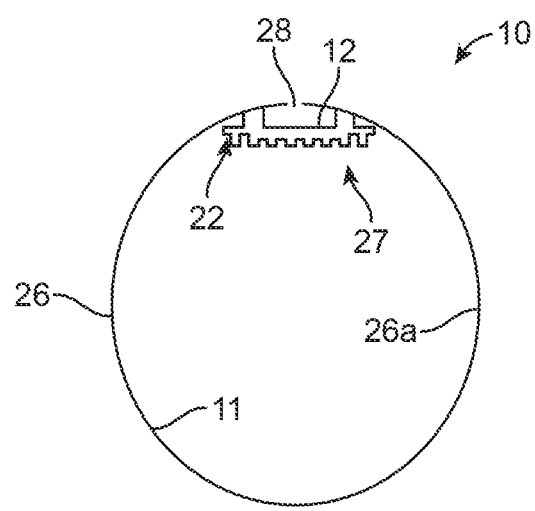
FIG. 4 is an end view of a hose to which the emitter shown in FIG. 3 is connected to form an irrigation hose.

Another example prior art emitter 22 is shown in a cross section view in FIG. 3 and the emitter 22 is shown operatively connected to a hose or tape 26 in FIG. 4. FIG. 4 shows the lamination of the emitter 22, via rails 25, on an inner wall 26a of the hose 26, thereby forming the irrigation hose or tape 10. The inner wall 26a and the emitter 22 form the hose or tape flow path 11 through the hose 10. A continuous strip member 27, including a plurality of emitters 22, is laminated to the hose 26 in a manner similar to the known process of laminating of the prior art (e.g., U.S. Pat. No. 8,469,294, incorporated herein by reference). The continuous strip member 27 may be rolled up and stored for later insertion into the hose 10. Alternately, the continuous strip member 27 may go right from the mold wheel onto the extruder for the hose 26. That is, the lamination of the rails 25 and emitter 22 (including top surface 22a and fins 22b) from the mold wheel is positioned inside of the die head extruding the hose 26 thereby forming the irrigation hose or tape 10. Suitable inlets (not shown) allow passage of water from the hose flow path 11 into the emitter flow path 12 through the emitter's inlets. Suitable outlets 28 are formed in the irrigation hose 10 above the outlet section of the emitter flow path, by means well known in the art.

Figure 24:
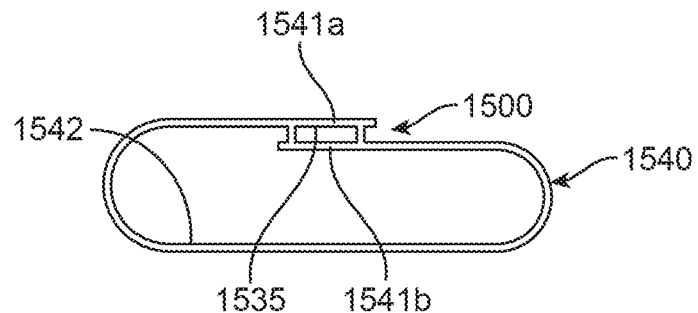
FIG. 24 is a schematic cross section view of a prior art irrigation tape including an emitter operatively connected in-seam to the tape.

These prior art emitter designs are non-limiting examples, and it is recognized that other suitable emitter designs could be used with the present invention including continuous emitter designs, hot melt emitter designs, discrete emitter designs, and in-seam emitter designs. An example in-seam emitter design is shown in FIG. 24. The emitter 1500 is operatively connected to a first side 1541a and a second side 1541b of a tape 1540 to form a tape flow path 1542 and an emitter flow path 1535. The emitter 1500 could be made online or offline prior to installing the emitter 1500 within the seam of the tape 1540. If this configuration is used, inlet members are positioned along the side proximate the tape flow path 1542. For in-seam emitter designs, row(s) are positioned along the side proximate the tape flow path.

To extend the amount of time irrigation hoses or tapes are functional, before flushing or replacement is necessary, embodiments of the disclosure include a variety of features and configurations for inlet portions, pressure reducing sections, and outlet portions of emitters, and the features and configurations of the embodiments may be interchanged and/or combined in a variety of different manners. The terms hose and tape are being used interchangeably herein. The emitters may be continuous emitters applied to hoses in any suitable manner, such as those described above. The variety of features and configurations for pressure reducing sections and outlet portions work together with the inlet portions to form an integrated emitter, in which a variety of features and configuration for inlet portions create differences in resistance, to provide staged flow path protection against clogging (filtration) and/or to assist with successively or sequentially activating the inlets gaps, which extends the amount of time irrigation hoses are functional because the inlet gaps do not clog all at once. Rather, water flows through first inlet gaps until they become clogged, then water flows through second inlet gaps, etc. Typically, water will enter the inlet gaps proximate the pressure reducing section first and as the inlet gaps become clogged, the water will enter the next available inlet gaps closest to the pressure reducing section.

Embodiment emitters generally include a base or floor with outwardly extending features to form outlet sections, pressure reducing sections, and inlet sections. Optionally, pressure responsive sections may interconnect the pressure reducing sections and the outlet sections. Optionally, the pressure reducing sections may include at least one pressure responsive element such as but not limited to inclusion of elastomeric material to enable changes in dimension in response to changes in pressure. Whereas a function of a pressure reducing section is to dissipate the differential pressure existing between the inlet and outlet sections, if a pressure responsive section is present, it functionally accomplishes a portion of this differential pressure dissipation. For this reason, it is apparent that references herein to pressure reducing section could also include a combination of pressure reducing and pressure responsive elements. The emitters form cavities with the tape wall to form emitter flow paths. The pressure reducing sections include middle portions between first rails and second rails. In some embodiments, the first and second rails extend into and through the outlet sections and are interconnected with end rails to terminate the outlet sections. The term emitter includes discreet emitters and emitter segments part of continuous emitters.

In some embodiments, each of the inlet sections includes at least one row of first inlet members that generally extends in line with one of the first and second rails. The at least one row includes a first proximal end proximate the respective rail and a first distal end. The at least one row could extend straight in line or could extend at angle(s) outward from one of the first and second rails. In some embodiments, the inlet sections include at least a first row extending outward from the first rail and a second row extending outward from the second rail, one or both extending straight in line or extending at angle(s) from the rails. The second row includes second inlet members and includes a second proximal end proximate the respective rail and a second distal end.

The inlet members extend outward from the emitter base (similar to top surface 22a in FIG. 3) to form inlet gaps including openings through which water from the tape flow path enters the emitter flow path. The inlet members could have at least one profile selected from the group consisting of round, oval, rectangular, triangular, and compound angular. The inlet members could include a variety of different configurations, including different profiles, sizes, widths, lengths, and heights. The first inlet members form first inlet gaps and, if there are second inlet members, they form second inlet gaps. The inlet gaps could be formed by spacing between the inlet members and/or by heights between inlet gap floors and the tape wall and/or different configurations of the inlet members. In some embodiments, the first row includes at least first spacing and second spacing and the second row, if used, includes at least third spacing and fourth spacing. In some embodiments, the distances vary between the inlet gap floors and the tape wall thereby varying the heights of the openings. In the first row, the first inlet gap floors and adjacent inlet members form openings that are smaller (first, lower heights) than openings formed by the second inlet gap floors and adjacent inlet members (second, higher heights) and, in the second row if used, the third inlet gap floors and adjacent inlet members form openings that are smaller (third, lower heights) than the openings formed by the fourth inlet gap floors and adjacent inlet members (fourth, higher heights). The first and third heights could be the same, and the second and fourth heights could be the same. A combination of varying spacing and varying heights could also be used.

Inlet gaps could be used on one or both sides of the inlet section. If there are at least two rows of inlet gaps, they could be different. Inlet gaps in different rows could have different opening sizes, they could be staggered or otherwise not aligned, and they could vary linearly (spacing) and/or laterally (height) to create differences in resistance and successively activating the inlet gaps. In addition, the dimensions of the inlet gaps could depend upon the desired function. For example, narrower gaps could be used with lower flow rates, wider gaps could be used with higher flow rates, etc. Also, for example, gap dimensions may be selected to work in conjunction with specific characteristics of pressure reducing sections and outlet portions to provide an overall integrated emitter.

Optionally, the emitters could include a guide member, and the guide member could include at least one guide rail portion. The at least one guide rail portion could be a relatively straight line, it could be angled, it could include compound angles, or it could include multiple configurations. The at least one guide rail portion could include a narrower portion and a wider portion so that the distances between the inlet members and the guide member, the inlet member to guide member gap(s), could vary.

The at least one guide rail portion could be any suitable length within the inlet portion and could even extend into the pressure reducing section. The at least one guide rail portion could extend toward the entrance of the pressure reducing section and terminate proximate the entrance, at the entrance, or beyond the entrance into the pressure reducing section. In some embodiments, the guide member is generally parallel with the inlet members. In some embodiments, the at least one guide rail portion is not parallel with the plurality of inlet members. In some embodiments, the at least one guide rail portion tapers relative to the inlet members. A portion of the guide member could be parallel to the inlet gaps, a portion could be angled or curved relative to the inlet gaps, and a combination of various configurations could be used. The optional guide member assists in creating differences in resistance, and to vary the fineness of filtration, to assist with successively activating the inlets gaps, preferably from proximate the proximal ends to the distal ends.

The distance between the inlet members and the guide member could be arranged to enhance inducement of sequential activation of the inlets and maintain motion for fine particles, and the distance could vary to enhance the sequential behavior. If more than one guide rail portion is used, the guide rail portions could have different distances from the inlet members.

It has been found to be beneficial to combine, sequentially, finer inlet gaps (openings) and less fine inlet gaps (openings). The finer inlet gaps are active first and provide more protection (via finer filtration) of the flow restriction area (pressure reducing section). If field conditions exist wherein the finer inlet gaps become occupied with debris (clogged), then the less fine inlet gaps allow the emitter to continue to operate longer, providing the opportunity to perform maintenance to flush debris from the inlet gaps. The length of the inlet section could also be increased to provide additional inlet gaps. The inlet geometry encourages sequential activity to occur from fine to less fine to . . . to least fine. This provides a final stage of protection in the form of wider inlet gaps so the last remaining inlet gaps remain active until such time maintenance can occur. The sequential behavior maximizes protection under normal circumstances and then wider inlet gaps (openings) are used, if needed, to maintain overall function of the emitter for a longer period of time thereby allowing continued functionality until maintenance occurs.

It has also been found to be beneficial to vary heights and/or configurations of the inlet sections, the pressure reducing sections, and/or the outlet sections. For example, the heights and/or configurations of the pressure reducing sections could be optimized to work with the heights and/or widths of the inlet openings. The heights could be varied by varying the thickness of the emitter base. The configurations could be varied by varying the shape of the inlet members and/or the emitter base.

Embodiments of the emitters are illustrated schematically in the drawings. A person having ordinary skill in the art will appreciate that various emitter components having suitable thicknesses. Suitable thicknesses could range from 0.005 to 0.025 inch.

Figure 5:
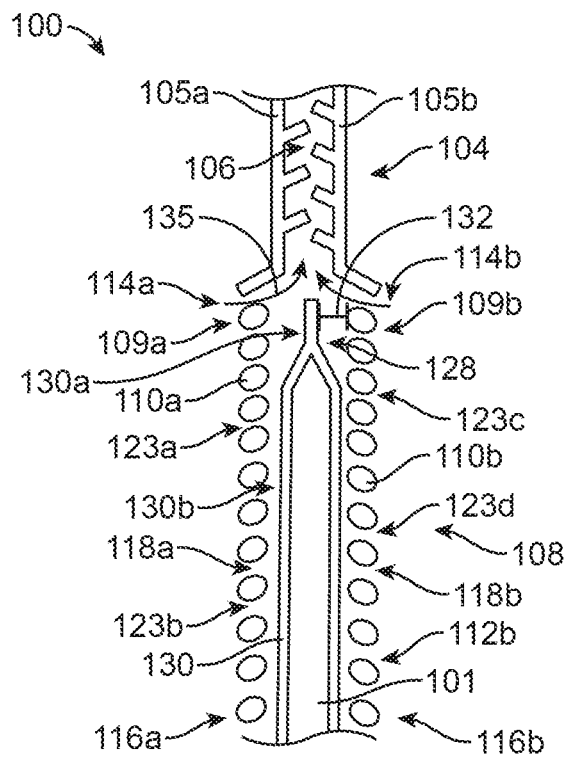
FIG. 5 is a schematic view of a portion of an embodiment emitter constructed in accordance with the principles of the present invention.

One example emitter portion 100, shown in FIG. 5, generally includes an outlet section (not shown), a pressure reducing section 104, and an inlet section 108. The emitter 100 forms a cavity with the tape wall to form an emitter flow path 135. The pressure reducing section 104 includes a middle portion 106 between a first rail 105a and a second rail 105b.

In this example, the inlet section 108 includes a first row 109a of first inlet members 110a and a second row 109b of second inlet members 110b that generally extend in line or parallel with the rails 105a and 105b, respectively. The first row 109a includes a first proximal end 114a proximate the first rail 105a and a first distal end 116a, and the second row 109b includes a second proximal end 114b proximate the second rail 105b and a second distal end 116b. It is recognized that the first and second rows 109a and 109b could extend generally straight in line or parallel with the first and second rails 105a and 105b, as shown, or they could extend at angle(s) outward from the first and second rails 105a and 105b. Alternatively, the rows could extend from the rails differently. The row(s) could extend along a portion of the emitter or along an entire length of the emitter. At least one row could extend along an entire length of the emitter. In addition, two or more rows could be used, and the two or more rows could have different lengths. If used with an in-seam emitter designs, row(s) are positioned along the side proximate the tape flow path.

Figure 21:
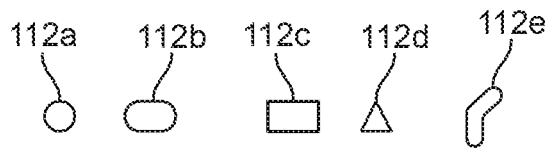
FIG. 21 is a schematic view of possible profiles for inlet members of an emitter constructed in accordance with the principles of the present invention.

The first and second inlet members 110a and 110b extend upward from the emitter base 101 (for example, a base is also shown in FIGS. 17A and 17B, similar to top surface 22a in FIG. 3) to form first and second inlet gaps 118a and 118b, respectively, through which water from the tape flow path enters the emitter flow path 135. Although an oval 112b profile is shown, the first and second inlet members 110a and 110b could have at least one profile selected from the group consisting of round 112a, oval 112b, rectangular 112c, triangular 112d, and compound angular 112e, as shown in FIG. 21. It is recognized that other suitable profiles could be used. In this example, the first and second inlet gaps 118a and 118b are formed by spacing between adjacent inlet members. The first row 109a includes at least first spacing 123a and second spacing 123b and the second row 109b includes at least third spacing 123c and fourth spacing 123d. In this example, the inlet members 110a and 110b are angled inward toward the pressure reducing section 104 and are generally mirror images of each other with closer spacing proximate the pressure reducing section 104 and further spacing proximate the distal ends 116a and 116b.

Optionally, the emitter 100 could include a guide member 128, and the guide member 128 could include at least one guide rail portion 130. Generally, the at least one guide rail portion could be a relatively straight line, it could be angled, it could include compound angles, or it could include multiple configurations. In this example, the at least one guide rail portion 130 includes a narrow portion 130a and a wide portion 130b so that the distances between the inlet members and the guide member, the inlet member to guide member gap(s) 132, vary. The guide member 128 includes a guide rail portion 130 forming a relatively narrow portion 130a proximate the pressure reducing section 104 that diverges into two guide rail portions 130 that are angled proximate the narrow portion 130a and are parallel proximate the distal ends forming a wide portion 130b. The gaps 132 are wider proximate the narrow portion 130a and narrower proximate the wide portion 130b.

Figure 6:
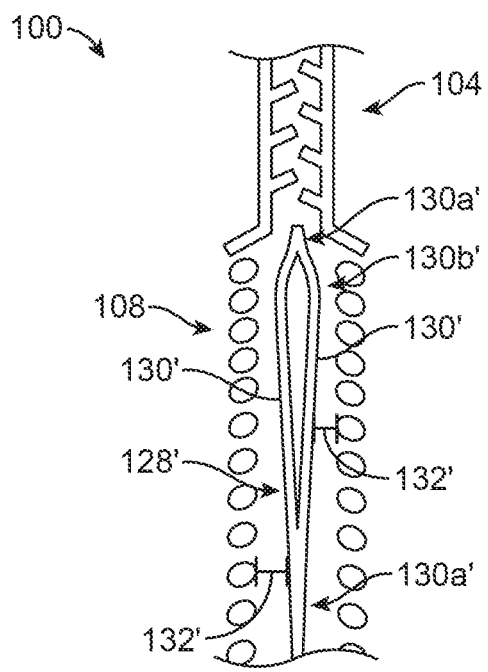
FIG. 6 is a schematic view of a portion of another embodiment emitter constructed in accordance with the principles of the present invention.

A variety of guide member configurations could be used. In another example, shown in FIG. 6, the emitter 100 could have a guide member 128' with guide rail portions 130', which generally form a narrow portion 130a' that diverges into two guide rail portions 130' forming a wide portion 130b' that tapers into a narrow portion 130a' thereby forming gaps 132' with varying distances.

Figure 7:
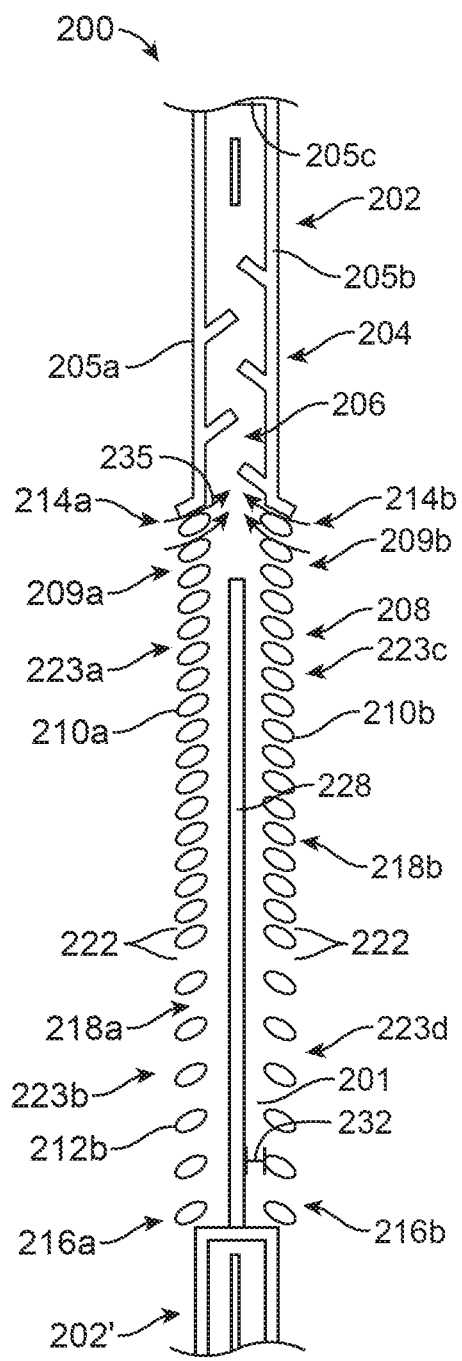
FIG. 7 is a schematic view of a portion of another embodiment emitter constructed in accordance with the principles of the present invention.

One example emitter portion 200, shown in FIG. 7, generally includes an outlet section 202, a pressure reducing section 204, and an inlet section 208. The emitter 200 forms a cavity with the tape wall to form an emitter flow path 235. The pressure reducing section 204 includes a middle portion 206 between a first rail 205a and a second rail 205b. In this example, the first and second rails 205a and 205b extend into and through the outlet section 202 and are interconnected with an end rail 205c to terminate the outlet section 202. This example emitter portion 200 is part of a continuous emitter, and outlet portion 202' is part of an outlet section from an adjacent emitter portion.

In this example, the inlet section 208 includes a first row 209a of first inlet members 210a and a second row 209b of second inlet members 210b that generally extend in line or parallel with the rails 205a and 205b, respectively. The first row 209a includes a first proximal end 214a proximate the first rail 205a and a first distal end 216a, and the second row 209b includes a second proximal end 214b proximate the second rail 205b and a second distal end 216b. The rows 209a and 209b are generally symmetrical. It is recognized that the first and second rows 209a and 209b could extend generally straight in line or parallel with the first and second rails 205a and 205b, as shown, or they could extend at angle(s) outward from the first and second rails 205a and 205b. Alternatively, the rows could extend from the rails differently.

The first and second inlet members 210a and 210b extend upward from the emitter base 201 (for example, a base is also shown in FIGS. 17A and 17B, similar to top surface 22a in FIG. 3) to form first and second inlet gaps 218a and 218b, respectively, through which water from the tape flow path enters the emitter flow path 235. Although an oval 212b profile is shown, the first and second inlet members 210a and 210b could have at least one profile selected from the group consisting of round 112a, oval 112b, rectangular 112c, triangular 112d, and compound angular 112e, as shown in FIG. 21. It is recognized that other suitable profiles could be used. The inlet members 210a and 210b are angled inward toward the pressure reducing section 204 to direct water into the pressure reducing section 204. In this example, the first and second inlet gaps 218a and 218b are formed by spacing between adjacent inlet members. The first row 209a includes at least first spacing 223a and second spacing 223b and the second row 209b includes at least third spacing 223c and fourth spacing 223d. Therefore, in this example, there are two groups of inlet gaps in each row, and adjacent openings 222 having different sizes. Optionally, the emitter 200 could include a guide member 228, which in this example is a relatively straight line proximate a middle of the inlet portion that terminates short of the pressure reducing section 204. The gap 232 is relatively constant between the guide member 228 and the inlet members 210a and 210b.

Figure 8:
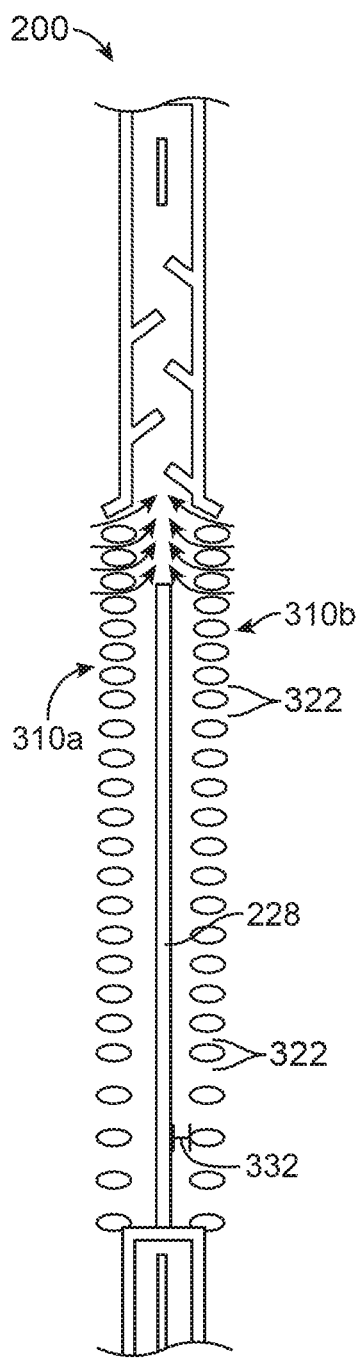
FIG. 8 is a schematic view of a portion of another embodiment emitter constructed in accordance with the principles of the present invention.

Alternatively, as shown in FIG. 8, the rows are generally symmetrical and the inlet members 310a and 310b are generally perpendicular (neutral) to the longitudinal axis of the emitter 200. In this example, there are three groups of inlet gaps in each row, and adjacent openings 322 have different sizes. A guide member 228 could be included and, in this example, the gap 332 is relatively constant between the guide member 228 and the inlet members 310a and 310b.

Figure 9:
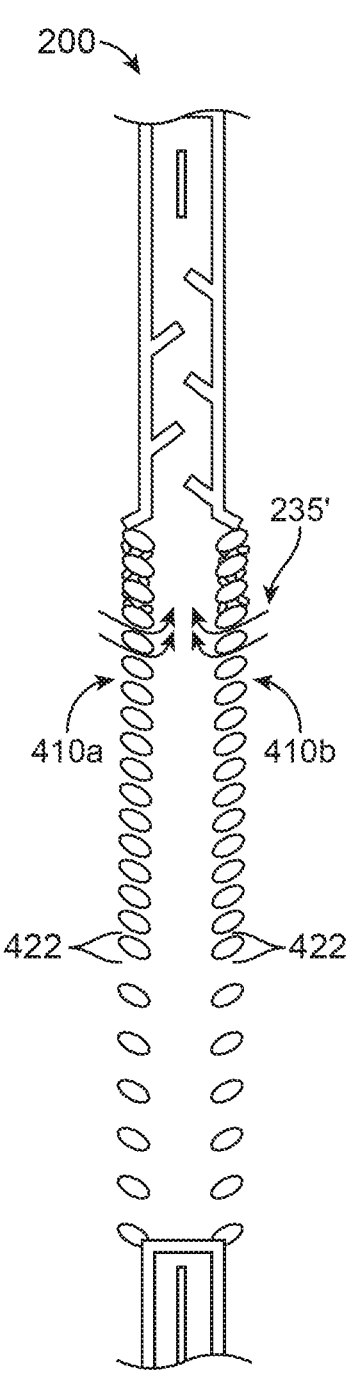
FIG. 9 is a schematic view of a portion of another embodiment emitter constructed in accordance with the principles of the present invention.

Alternatively, as shown in FIG. 9, inlet members 410a and 410b are angled outward away from the pressure reducing section 204 to direct water proximate the middle of the inlet section 208 and into the pressure reducing section 204. There are two groups of inlet gaps in each row, and adjacent openings 422 have different sizes. FIG. 9 also illustrates an example sequential activation of the inlet openings as openings proximate the proximal ends become clogged, thereby allowing water to enter the emitter flow path more proximate the middle of the inlet portion. As the openings proximate the proximal ends get clogged, successive openings are generally sequentially activated from proximal ends to distal ends to allow water to enter the emitter flow path 235'.

Figure 10:
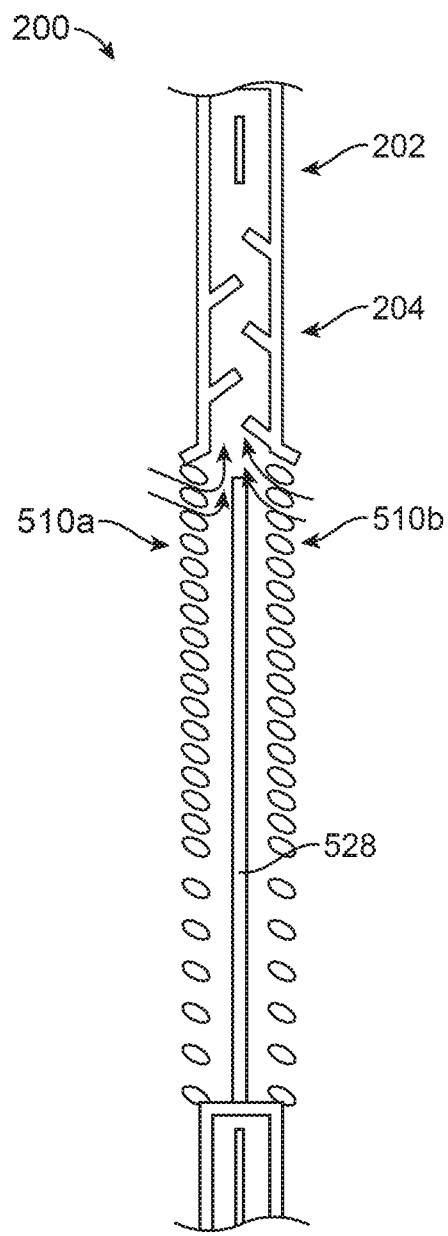
FIG. 10 is a schematic view of a portion of another embodiment emitter constructed in accordance with the principles of the present invention.
Figure 11:
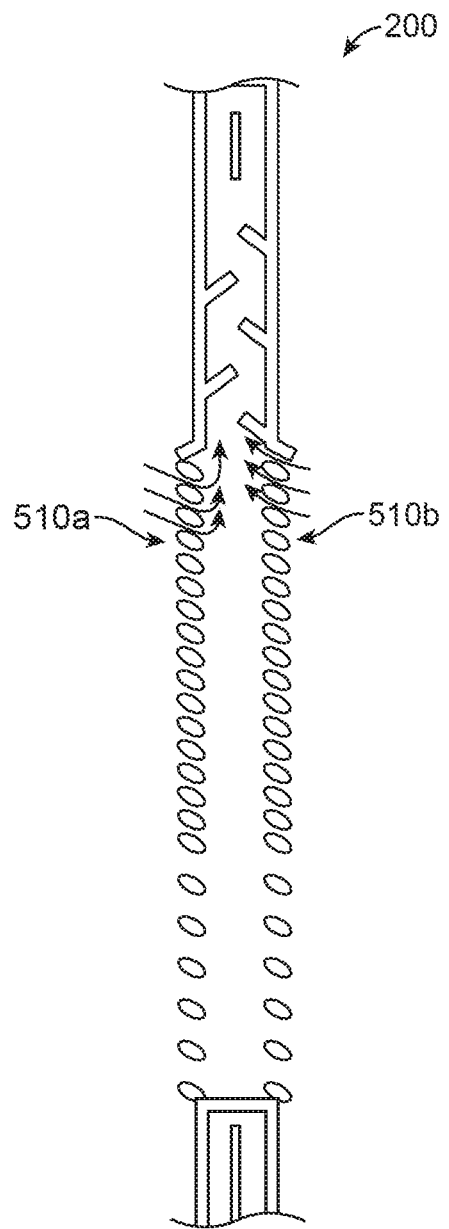
FIG. 11 is a schematic view of a portion of another embodiment emitter constructed in accordance with the principles of the present invention.

Alternatively, as shown in FIG. 10, inlet members 510a are angled outward away from the pressure reducing section 204 and inlet members 510b are angled inward toward the pressure reducing section. Optional guide member 528 is used to help direct the water into the pressure reducing section 204. FIG. 11 shows a similar example without a guide member.

Figure 12:
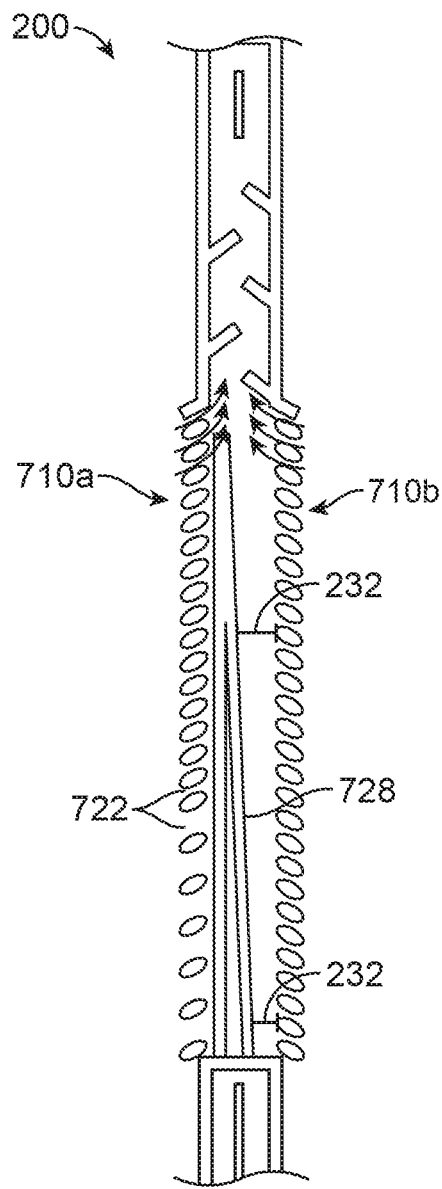
FIG. 12 is a schematic view of a portion of another embodiment emitter constructed in accordance with the principles of the present invention.

Alternatively, as shown in FIG. 12, inlet members 710a and 710b are angled inward toward the pressure reducing section. Inlet members 710a includes openings with different sizes, the openings being smaller proximate the proximal end and larger proximate the distal end, and at least one pair of adjacent openings 722 having different sizes. Inlet members 710b are generally evenly spaced with openings of approximately the same sizes. A guide member 728 is generally parallel with the inlet members 710a and angles outward from proximate the proximal end of the inlet members 710a to proximate the distal end of the inlet members 710b. This provides gaps 232 that are wider proximate the proximal end and narrower proximate the distal end of the inlet members 710b.

Figure 13:
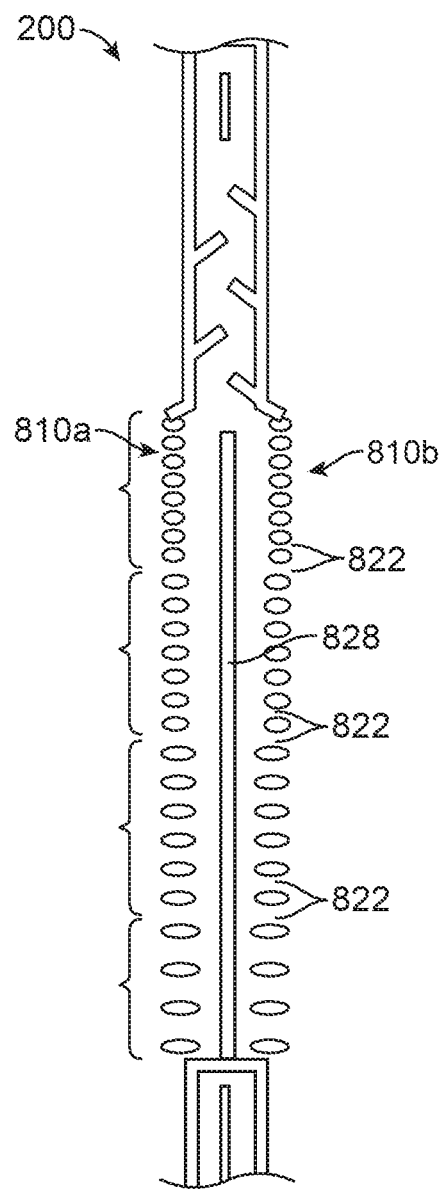
FIG. 13 is a schematic view of a portion of another embodiment emitter constructed in accordance with the principles of the present invention.

Alternatively, as shown in FIG. 13, each of the first and second rows includes four groups of inlet gaps formed by inlet members 810a and 810b having different sizes, shapes, and spacing (opening sizes). Adjacent openings 822 have different sizes. Optionally, a guide member 828 could be used.

Figure 14:
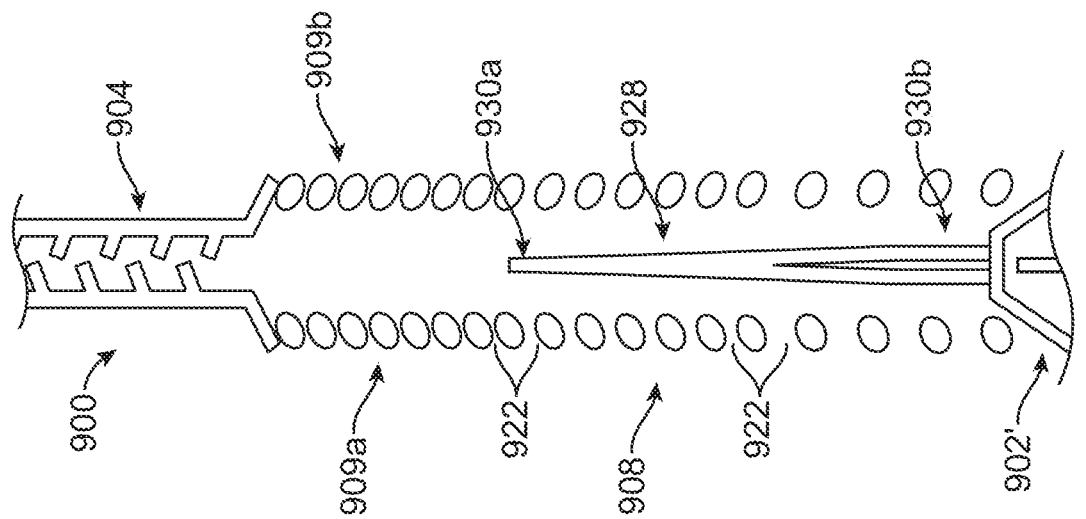
FIG. 14 is a schematic view of a portion of another embodiment emitter constructed in accordance with the principles of the present invention.

One example emitter portion 900, shown in FIG. 14, includes an outlet section (not shown), a pressure reducing section 904, an inlet section 908, and an outlet section 902' from an adjacent emitter portion. Each row of inlet members 909a and 909b includes three groups of inlet gaps, with adjacent openings 922 having different sizes, and a guide member 928 may be included. The inlet gaps increase from smaller to larger from the proximal ends to the distal ends of the inlet members. The guide member 928 is generally V-shaped with the narrow portion 930a proximate a juncture of the first and second groups of inlet gaps and the wide portion 930b proximate the third groups and the distal ends.

Figure 15:
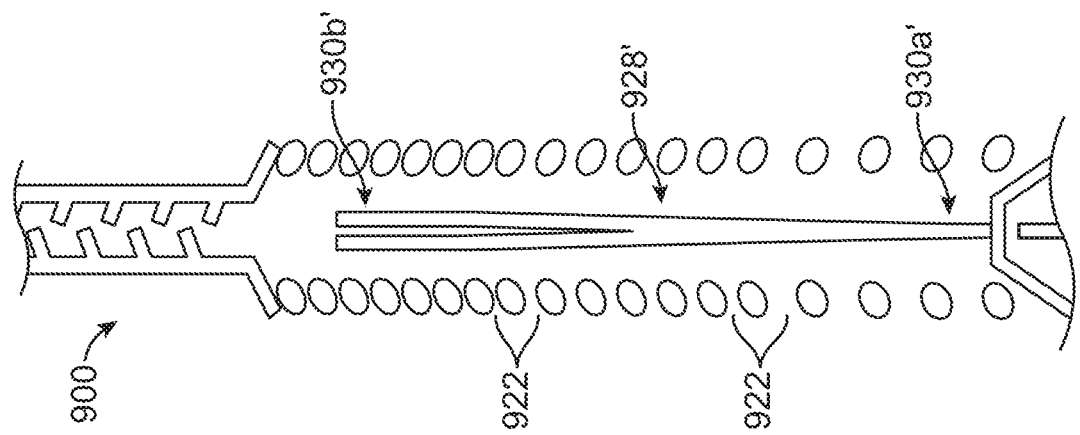
FIG. 15 is a schematic view of a portion of another embodiment emitter constructed in accordance with the principles of the present invention.

Alternatively, as shown in FIG. 15, the guide member 928' is generally a longer V-shape with the narrow portion 930a' proximate the distal ends and the wide portion 930b' proximate the proximal ends.

Figure 16:
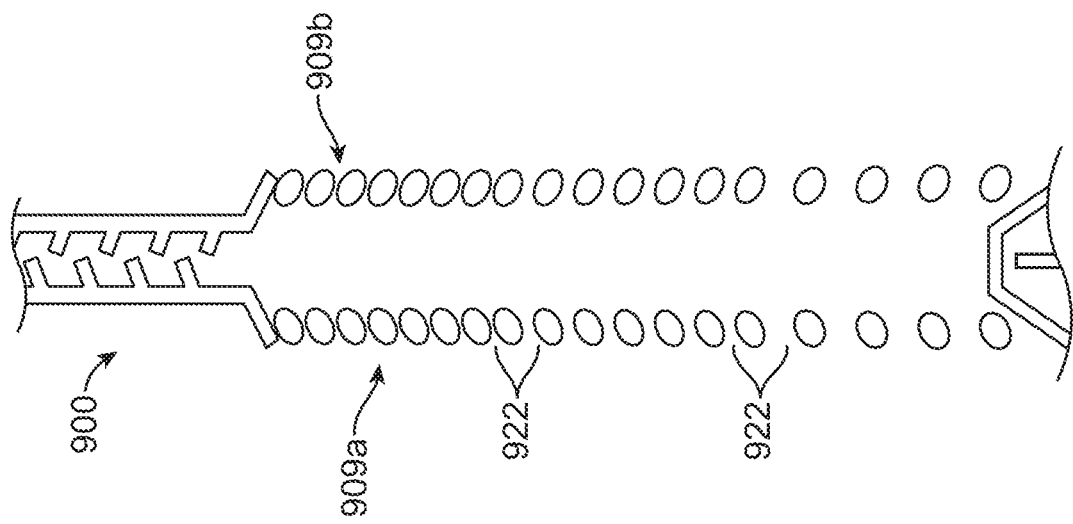
FIG. 16 is a schematic view of a portion of another embodiment emitter constructed in accordance with the principles of the present invention.

Alternatively, as shown in FIG. 16, there is no guide member. It is recognized that no guide member or one of a variety of guide members could be used.

FIGS. 17, 17A, and 17B illustrate another example emitter portion 1000 with alternative configurations of openings. The emitter 1000 includes an outlet section 1002, a pressure reducing section 1004, and inlet section 1008, and an outlet section 1002' from an adjacent emitter portion. The inlet section 1008 includes inlet members 1009a and 1009b, which may be evenly spaced as shown. In one example, shown in FIG. 17A, the gap floors gradually decrease in height between the inlet members thereby gradually increasing the opening sizes from proximate the pressure reducing section to the distal ends. For example, a gap floor 1020c has a height 1024c that is higher proximate the pressure reducing section 1004 thereby forming with adjacent inlet members 1009b a relatively small opening, and a gap floor 1020d has a height 1024d that is lower proximate the distal ends thereby forming with adjacent inlet members 1009b a relatively large opening. Alternatively, the gap floors could be in groups with a number of gap floors one height, a number of gap floors another height, etc. with each group decreasing in height. For example, as shown in FIG. 17B, a first group G1 has gap floors 1020c' of height 1024c' forming with adjacent inlet members 1009b relatively small openings, a second group G2 has gap floors 1020d' of height 1024d' forming with adjacent inlet members 1009b relatively large openings, and a third group G3 between the first and second groups has gap floors 1020e of height 1024e forming with adjacent inlet members 1009b intermediate sized openings. It is recognized that any suitable number of groups could be used. Also, rather than being generally parallel with the base, the gap floors could be angled to taper the heights. Therefore, inlet opening sizes could not only be formed by spacing between adjacent inlet members but also by gap floor height and/or gap floor angle, or a combination thereof, to vary the fineness of filtration.

One example emitter portion 1100, shown in FIG. 18, includes an outlet section 1102, a pressure reducing section 1104, an inlet section 1108, and an outlet section 1102' from an adjacent emitter portion. Each row of inlet members 1109a and 1109b includes successively larger inlet gaps from proximate the pressure reducing section 1104 to proximate the distal ends. The profiles of the inlet members 1109a and 1109b are compound angular 1112e to direct water into the inlet section 1108 and toward the pressure reducing section 1104. In addition, the compound angular 1112e profiles could include tapered ends.

Figure 19F:
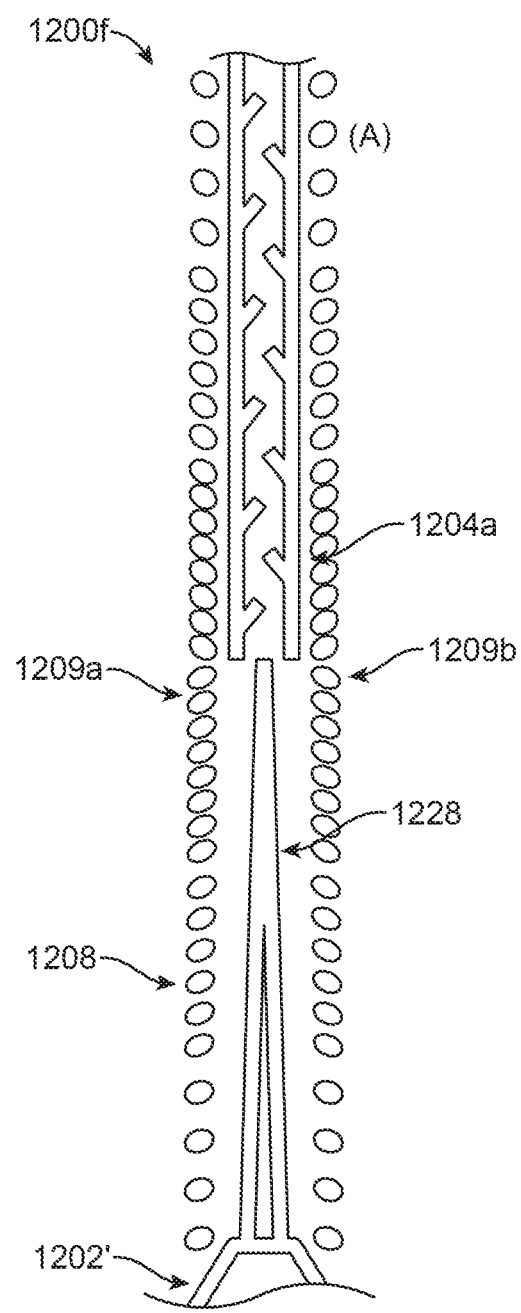
FIG. 19F is a schematic view of the portion of the emitter shown in FIG. 19A with another embodiment pressure reducing section and a guide member.

Example emitter portions 1200a through 1200f, shown in FIGS. 19A through 19F, respectively, include common features indicated with like reference numerals and include different features that may be interchanged among the embodiments. In these examples, rows of inlet members 1209a and 1209b are spaced more closely together proximate an opening into a pressure reducing section (example pressure reducing sections 1204a through 1204e in FIGS. 19A through 19E, respectively) and are gradually spaced further apart as they approach the outlet section. In these examples, the inlet members 1209a and 1209b extend along the inlet section 1208 and the pressure reducing section to both outlet sections (only 1202' shown). Optionally, the inlet members proximate the pressure reducing section and the inlet members proximate the inlet section 1208 are both angled toward the junction of the pressure reducing section and the inlet section to direct the water toward the junction and into the pressure reducing section. FIG. 19F is similar to FIG. 19A but includes a guide member 1228 that is a V-shape with a narrow portion proximate the entrance to the pressure reducing section 1204a and a wide portion proximate the outlet 1202', and the gaps between the inlet members and the guide member narrow toward the distal ends. A guide member could be used with any of the embodiments.

FIGS. 20A through 20E illustrate the flow of water through the pressure reducing sections 1204a through 1204e, respectively. The thicker, longer arrows indicate the primary flow of water through the pressure reducing sections, and the thinner, shorter arrows indicate the secondary flow of water through the pressure reducing sections. Areas 1206a through 1206e indicate where the primary flow streamline contacts resistance features within the pressure reducing sections, and areas 1207a through 1207d indicate where debris may accumulate in the pressure reducing sections. The pressure reducing section 1204a is more efficient in creating a pressure drop but less efficient in conveying debris through the section than pressure reducing section 1204b, the pressure reducing section 1204b is more efficient in creating a pressure drop but less efficient in conveying debris through the section than pressure reducing section 1204c, the pressure reducing section 1204c is more efficient in creating a pressure drop but less efficient in conveying debris through the section than pressure reducing section 1204d, and the pressure reducing section 1204d is more efficient in creating a pressure drop but less efficient in conveying debris through the section than pressure reducing section 1204e.

Figure 20A:
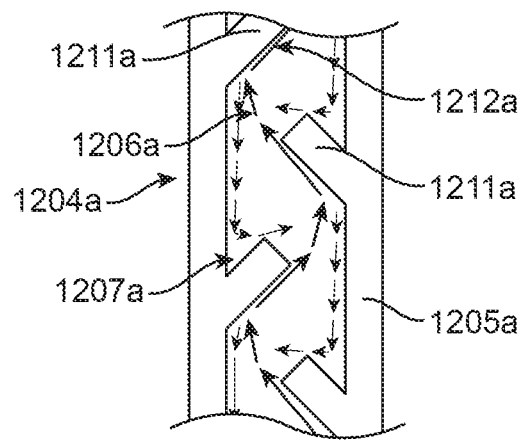
FIG. 20A is a schematic view of a portion of the pressure reducing section of the portion of the emitter shown in FIG. 19A.

In FIG. 20A, the pressure reducing section 1204a generally includes linear rails 1205a and resistance features 1211a with faces 1212a angled relative to rails 1205a. Areas 1206a indicate where the primary flow streamline contacts resistance features 1211a, and areas 1207a are in the downstream wakes of the resistance features 1211a and form "dead-zones" where recirculating debris may settle and accumulate.

Figure 20B:
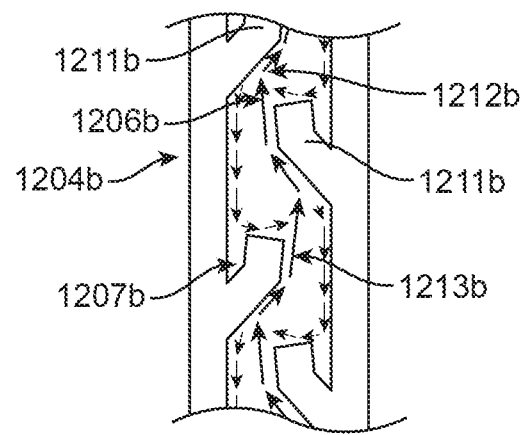
FIG. 20B is a schematic view of a portion of the pressure reducing section of the portion of the emitter shown in FIG. 19B.

In FIG. 20B, the pressure reducing section 1204b generally includes resistance features 1211b with angled faces 1212b and angled tips 1213b. The angled tips 1213b direct the streamline coming off the tips to make contact with the subsequent resistance features 1211b at locations further out along the subsequent resistance features' faces 1212b. This promotes a higher percentage of the debris to continue along the labyrinth and a lower percentage of the debris to recirculate. Areas 1206b indicate where the primary flow streamline contacts resistance features 1211b, and areas 1207b are in the downstream wakes of the resistance features 1211b and form "dead-zones" where recirculating debris may settle and accumulate. Although not illustrated, the angled faces may be compound angles (more than one departure from linear) or curvilinear as well to direct the streamline.

Figure 20C:
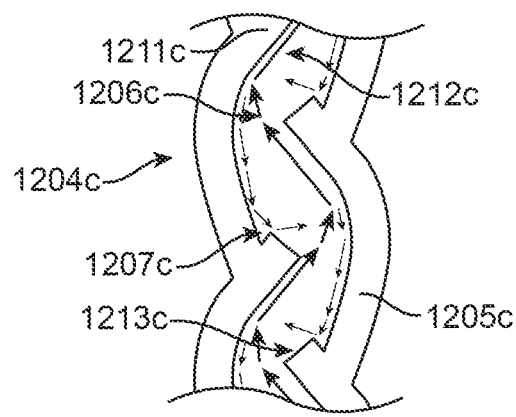
FIG. 20C is a schematic view of a portion of the pressure reducing section of the portion of the emitter shown in FIG. 19C.

In FIG. 20C, the pressure reducing section 1204c generally includes angled faces 1212c and also includes non-linear rails 1205c to both facilitate more efficient recirculation as compared to the pressure reducing section 1204a and to reduce the areas 1207c in the wakes of the resistance features 1211c. Areas 1206c indicate where the primary flow streamline contacts resistance features 1211c, and areas 1207c are in the downstream wakes of the resistance features 1211c and form "dead-zones" where recirculating debris may settle and accumulate. Although FIG. 20C depicts curvilinear non-linear rails, a related benefit can be achieved using two, or more, linear elements to form a non-linear rail between subsequent resistance features.

Figure 20D:
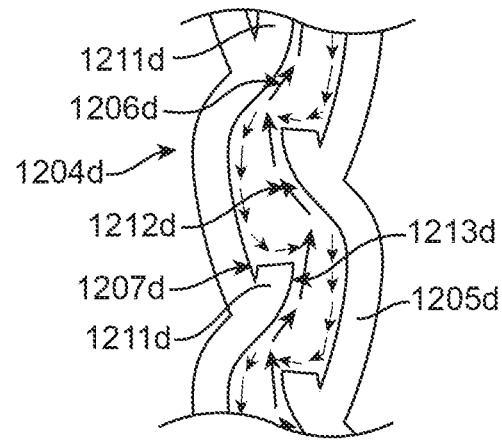
FIG. 20D is a schematic view of a portion of the pressure reducing section of the portion of the emitter shown in FIG. 19D.

In FIG. 20D, the pressure reducing section 1204d generally includes non-linear rails 1205d and resistance features 1211d with curved compound angled faces 1212d and angled tips 1213d. Compared to the pressure reducing section 1204b, this design reduces areas 1207d and facilitates more efficient recirculation while also retaining the benefit of shifting the streamline of the primary flow to be outward closer to the distal ends or tips of subsequent resistance features 1211d. This example provides the benefits of pressure reducing sections 1204b and 1204c. Areas 1206d indicate where the primary flow streamline contacts resistance features 1211d, and areas 1207d are in the downstream wakes of the resistance features 1211d and form "dead-zones" where recirculating debris may settle and accumulate.

Figure 20E:
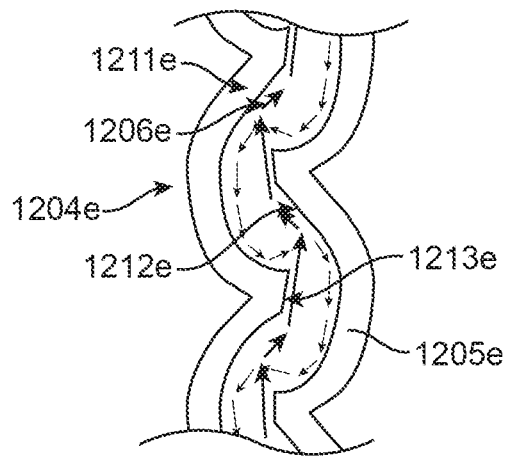
FIG. 20E is a schematic view of a portion of the pressure reducing section of the portion of the emitter shown in FIG. 19E.

In FIG. 20E, the pressure reducing section 1204e generally includes non-linear rails 1205e forming resistance features 1211e with no dead-zones in the downstream wakes of the resistance features 1211e. In this embodiment, the features are formed by the non-linear rails. The resistance features 1211e include angled faces 1212e, and angled tips 1213e. Other similar configurations exist, such as, for example, the resistance features 1211e may include angled straight face absent the angled tip, or may include more than one linear face combined to form a compound angled face with or without angled tip. In the design of FIG. 20E, the resistance features themselves serve the function of the rails to isolate flow within the inside of the emitter from fluid present outside of the emitter. This differs from traditional designs in which the outboard rails isolate the flow within the pressure reducing section from interfacing with pressure outside the emitter but do not serve the purpose of being a primary resistance feature. In this example, the resistance features extending from the "outer walls" are actually a portion of the outer walls themselves. Areas 1206e indicate where the primary flow streamline contacts resistance features 1211e, and there are no areas in the downstream wakes of the resistance features 1211e where recirculating debris could settle and accumulate.

In these examples illustrated in FIGS. 20A-20E, overall clogging resistance of an integrated sequentially active inlet emitter may be optimized by balancing the design of inlets to match the pressure reducing sections' abilities to convey debris efficiently through to the outlet sections. The outlet section itself can be configured to be similarly capable to the inlet and pressure reducing section with regard to conveying debris. It is the combination of the inlet section design, pressure reducing section design, and outlet section design embodiments herein that optimize the overall clogging resistance for emitter flow and emitter spacing combinations. When designing an emitter with longer length available for the pressure reducing section, one may choose to select a design with less efficient pressure drop creation while taking advantage of improved debris conveying. The accompanying sequentially active inlet design would be selected to provide a debris size optimized to work with the selected pressure reducing section design. In so doing, the inlet design does not become "overly restrictive" compared to the pressure reducing section. Said differently, if an emitter were designed in standard manner, the filtration the inlets provide can become the weakest link in the overall design due to rapidly becoming filled and in need of system maintenance to remove debris accumulated on the inlet features. With this invention, the inlet design can be less restrictive (i.e. longer time between maintenance) by selecting a pressure reducing section and outlet section designs capable of passing larger debris by incorporating the inventions herein. By tailoring the inlet design, the pressure reducing section design and the outlet section design in conjunction, an overall benefit can be accomplished with regard to resistance to becoming clogged.

Figure 46D:
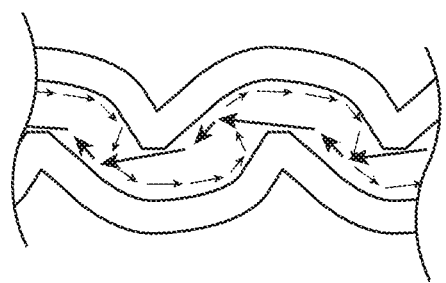
FIG. 46D is a schematic view of a portion D of the pressure reducing section shown in FIG. 46A.
Figure 46C:
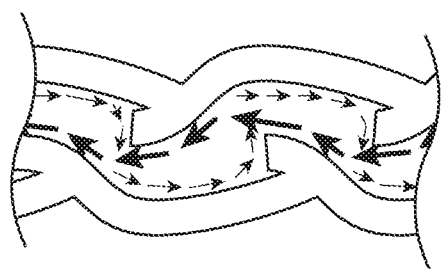
FIG. 46C is a schematic view of a portion C of the pressure reducing section shown in FIG. 46A.
Figure 46B:
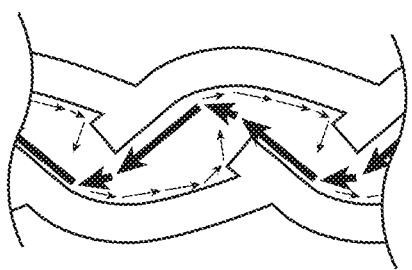
FIG. 46B is a schematic view of a portion B of the pressure reducing section shown in FIG. 46A.
Figure 46A:
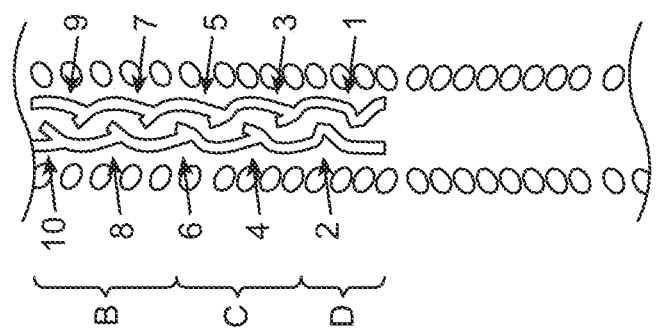
FIG. 46A is a schematic view of a portion of another embodiment emitter including portions of a pressure reducing section having different configurations constructed in accordance with the principles of the present invention.

FIG. 46A illustrates a portion of another embodiment emitter including portions of a pressure reducing section having different configurations B, C, and D shown in FIGS. 46B, 46C, and 46D, respectively. Using changing geometry such as but not limited to those illustrated in FIG. 46A has benefits. For example, when water and debris first enter the pressure reducing section, the velocity streamlines are not yet established. This is a location where the pressure reducing section can be most vulnerable to blockage. For this reason, geometry as illustrated in FIG. 46D, which is similar to that shown in FIG. 20E with no "dead-zones", can be useful. However, geometry according to FIG. 46D is not especially efficient for creating pressure drop. As the water and debris move further along the pressure reducing section, the streamlines become more prevalent and the mixture is better able to traverse through a section without depositing debris, as indicated by the thicker arrows. A section illustrated in FIG. 46C, which is similar to FIG. 20D, may be appropriate here. However, although more efficient at pressure drop than FIG. 46D, FIG. 46C is still not as efficient as FIG. 46B. Eventually, when water and debris have passed further yet, the streamlines are stronger yet and geometry analogous to FIG. 46B may be appropriate. The geometry shown here has rails of varying configurations (larger and larger radius of curvature, curvilinear, although not shown here could also become straight rail further downstream, linear compound angle, rail dimension, rail separation distance) and features of varying configurations (curved compound angle, linear compound angle, different tip angles, linear without tip angle, different linear angles, interval(s) between features, feature shape, feature dimension). This example includes portions similar to those of FIGS. 20C, 20D, and 20E, however, any suitable geometries may be used including any suitable continuum of changing geometries may be used. For example, the configuration at 1 may differ from 2, which may differ from 3, which may differ from 4, which may differ from 5, which may differ from 6, which may differ from 7, which may differ from 8, which may differ from 9, which may differ from 10, and etc. These configurations could be transitions from a first portion configuration to a second portion configuration etc. For example, locations 1, 2, and 3 may include gradual changes in configurations transitioning from a first portion into a second portion, locations 4, 5, and 6 may include gradual changes in configurations transitioning from a second portion into a third portion, and etc.

One example emitter portion 1300, shown in FIGS. 22A and 22B, includes an elongated inlet section 1308 with relatively thin, closely spaced inlet members proximate the pressure reducing section 1304 and relatively thick, further spaced inlet members proximate the distal ends of the inlet members 1309a and 1309b. The inlet members could be generally rectangular as shown or tapered to direct water into the pressure reducing section 1304. FIG. 22B includes a guide member 1328 similar to guide member 1228. This example provides multi-width inlet gaps (openings) for either staged flow path protection against clogging (fine, less fine, . . . ) or for sequential inlet activation.

One example emitter portion 1400, shown in FIGS. 23A and 23B, includes an elongated inlet section 1408 with relatively thin, closely spaced inlet members proximate the pressure reducing section 1404, relatively thick, further spaced inlet members proximate the distal ends of the inlet members 1409a and 1409b, and intermediate sized and spaced inlet members therebetween. The inlet members could be generally rectangular as shown or tapered to direct water into the pressure reducing section 1404. FIG. 23B includes a guide member 1428 similar to guide members 1228 and 1328. This example provides multi-width inlet gaps (openings) for either staged flow path protection against clogging (fine, less fine, . . . least fine) or for sequential inlet activation.

Figures 25A, 25B:
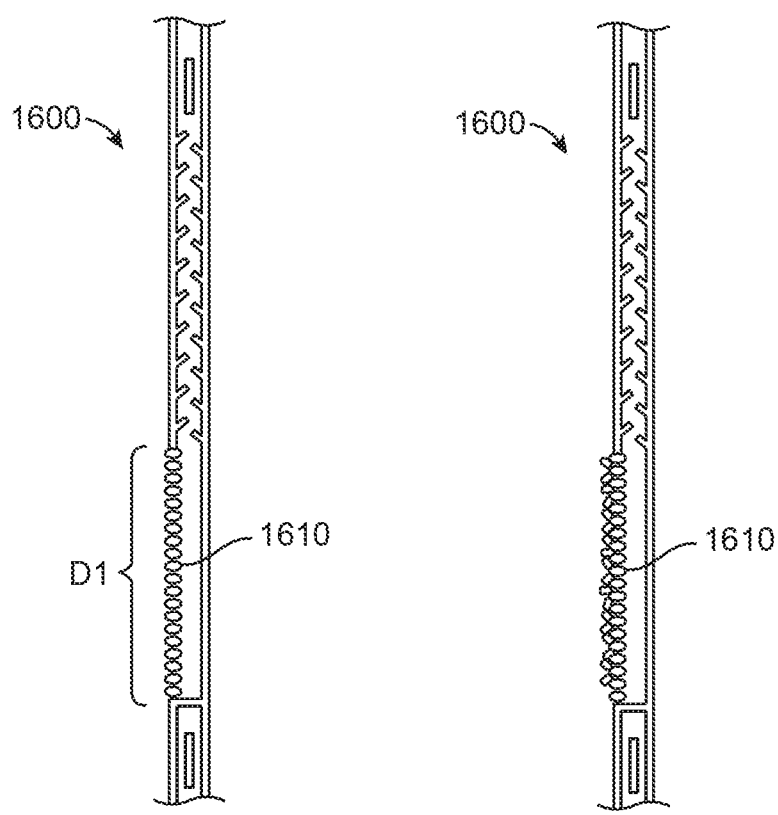
FIG. 25A is a schematic view of a portion of another embodiment emitter constructed in accordance with the principles of the present invention.
FIG. 25B is a schematic view of the portion of the emitter shown in FIG. 25A with debris proximate inlet members.

FIGS. 25A and 25B illustrate inlet members 1610 within the inlet section along one side of emitter 1600. Although the inlet members 1610 have a generally consistent density D1, they could have varying configurations to provide varying sizes of inlet gaps and openings. FIG. 25B illustrates how debris could accumulate proximate the inlet members 1610.

Figures 26A, 26B:
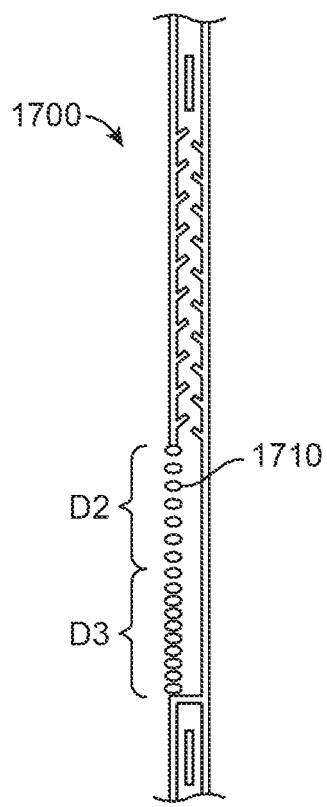
FIG. 26A is a schematic view of a portion of another embodiment emitter constructed in accordance with the principles of the present invention.
FIG. 26B is a schematic view of the portion of the emitter shown in FIG. 26A with debris proximate inlet members.

FIGS. 26A and 26B illustrate inlet members 1710 within the inlet section along one side of emitter 1700. This example shows inlet members 1710 having a first gap density D2 forming larger openings proximate the proximal end and a second gap density D3 forming smaller openings proximate the distal end. The larger openings proximate the proximal end prevent larger debris, for example which is often present during irrigation start-up, from clogging the inlet section. The larger openings prevent larger debris from entering the inlet section while allowing water to enter the emitter flow path. As the larger openings become clogged, for example by larger debris during start-up, the smaller openings allow water to enter the emitter flow path, as shown in FIG. 26B.

The emitters 1600 and 1700 could be used with a variety of hoses or tapes, including but not limited to in-seam installations with the inlet members in fluid communication with the hose or tape flow path.

Figure 27:
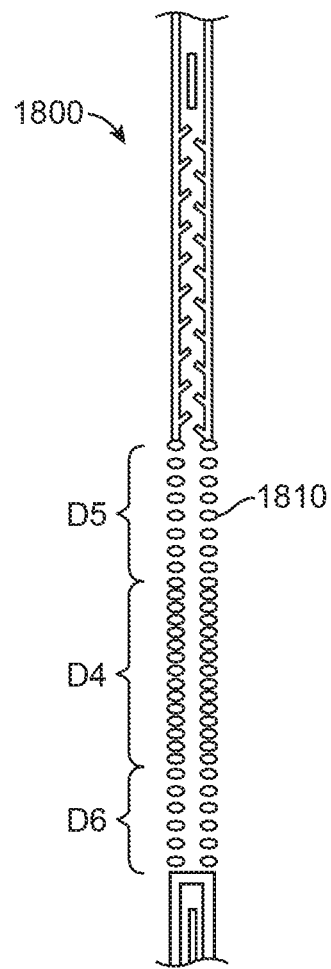
FIG. 27 is a schematic view of a portion of another embodiment emitter constructed in accordance with the principles of the present invention.

FIG. 27 illustrates an emitter 1800 with inlet members 1810 having three different densities D4, D5, and D6 forming three sizes of openings. Although different arrangements could be used, this example includes smaller openings formed in D4 interconnecting larger openings formed in D5 and D6.

Generally, FIGS. 28-30 illustrate outer inlet members having proximal ends proximate the pressure reducing sections and distal ends proximate the outlet sections. If more than one row of inlet members is used, one or more of the rows could include different opening sizes. For example, FIGS. 29 and 30 illustrate embodiments in which inner inlet members are evenly spaced and outer inlet members have varied spacing. In addition, the inlet members may be angled relative to the emitter rails, which could also be angled, relative to the longitudinal axis of the emitter.

FIG. 28 illustrates emitters 1900 and 1900' having inlet members 1910 and 1910' along one side of the emitters with a variety of configurations and different opening sizes proximate different sections of the emitters. For example, proximate the inlet section and the pressure reducing section, the inlet members 1910a form smaller openings between the inlet members, and proximate the pressure reducing sections and the outlet sections, the inlet members 1910b, 1910c, 1910b', and 1910c' form larger openings between the inlet members. In addition to longitudinal spacing between adjacent inlet members, the lateral lengths of the inlet members

1910a, 1910b, 1910c, and 1910d could differ, as shown, so as to define changing distances between innermost portions of the inlet members and outermost portions of the rails inboard of the inlet members, as a means of encouraging sequentially active inlets. In this scenario, a possible progression could generally be that water would first flow through openings formed by inlet members 1910a and then into the inlet portion either directly or via a space between the inlet members and the rail. When the openings formed by inlet members 1910a become clogged, water would enter the openings formed by inlet members 1910b and 1910d', and when these openings become clogged, water would enter the openings formed by inlet members 1910c and 1910c'. Water flowing through the openings formed by inlet members 1910c may flow to one or both adjacent emitters, and water flowing through the openings formed by inlet members 1910d and 1910b' flows to the inlet portion of the nearest emitter. Although this possible scenario is illustrated and described, it is understood that different progressions could occur.

FIG. 29 illustrates an emitter 2000 having inner inlet members 2010 and outer inlet members 2011 along one side of the emitter 2000. Optionally, one side 2005a of the rails could include one or more angled portion and the inner inlet members 2010 could also be angled relative to the longitudinal axis of the emitter. The other side 2005b could also include one or more angled portion.

FIG. 30 illustrates an emitter 2100 having inner inlet members 2110 and outer inlet members 2111, and the rails 2105a and 2105b include angled portions, along both sides of the emitter 2100. The angled portions of the rails 2105a and 2105b do not need to be symmetrical with regard to the longitudinal axis of the emitter. An optional guide member 2128 is also shown.

FIG. 31 illustrates an emitter 2200 having inlet members 2210 formed with different configurations and opening sizes, and one side is longer in length than the other side. FIG. 31A illustrates differently shaped inlet members forming an effective inlet gap G. The effective inlet gap defines an inlet opening.

Some features of the embodiments illustrated in FIGS. 28-31 include:

1. One, or more, of the pressure reducing section rails are not parallel with one, or more, of the inlet rows.
   a. Most inward extension of inlet features are parallel with axis of emitter, while the outermost portion of the pressure reducing section rails are not parallel with axis of emitter.
   b. Most inward extension of inlet features not parallel with axis of emitter, while the outermost portion of the pressure reducing section rails are parallel with axis of emitter.
   c. Most inward extension of inlet features, and the outermost portion of the pressure reducing section rails, are both not parallel with axis of the emitter.
2. One, or more, of the pressure responsive section rails are not parallel with one, or more, of the inlet rows.
   a. Most inward extension of inlet features are parallel with axis of emitter, while the outermost portion of the pressure responsive section rails are not parallel with axis of emitter.
   b. Most inward extension of inlet features not parallel with axis of emitter, while the outermost portion of the pressure responsive section rails are parallel with axis of emitter.
   c. Most inward extension of inlet features, and the outermost portion of the pressure responsive section rails, are both not parallel with axis of the emitter.
3. One, or more, of outlet section rails are not parallel with one, or more, of the inlet rows.
   a. Most inward extension of inlet features are parallel with axis of emitter, while the outermost portion of the outlet section rails are not parallel with axis of emitter.
   b. Most inward extension of inlet features not parallel with axis of emitter, while the outermost portion of the outlet section rails are parallel with axis of emitter.
   c. Most inward extension of inlet features, and the outermost portion of the outlet section rails, are both not parallel with axis of the emitter.
4. One, or more, features within an inlet row are offset with regard to features in one, or more, adjacent inlet rows.
5. One, or more, features within one, or more, inlet rows are at a different angle compared to other features in an inlet row.
6. One, or more, inlet rows have all, or portions, of features arranged so that the row is not parallel with the overall emitter axis.
7. One, or more, inlet rows utilize relative position of two, or more, inlet member profiles to define effective inlet gaps.

Figure 32:
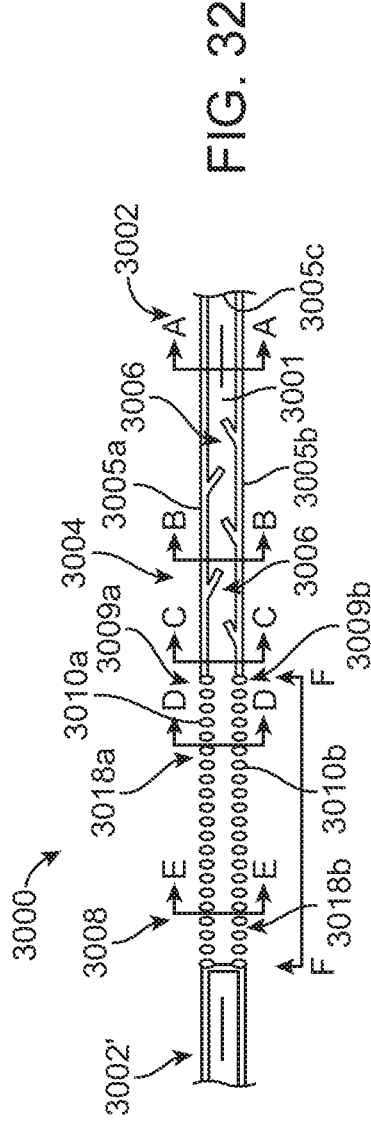
FIG. 32 is a schematic view of a portion of another embodiment emitter constructed in accordance with the principles of the present invention.

One example emitter portion 3000, shown in FIG. 32, generally includes an outlet section 3002, a pressure reducing section 3004, an inlet section 3008, and a portion of an outlet section 3002' from an adjacent emitter portion extending from a base 3001. The emitter 3000 forms a cavity with the hose or tape wall to form an emitter flow path. The pressure reducing section 3004 includes a middle portion 3006 between a first rail 3005a and a second rail 3005b, and an end rail portion 3005c interconnects the first and second rail portions 3005a and 3005b proximate an outlet.

In this example, the inlet section 3008 includes a first row 3009a of first inlet members 3010a and a second row 3009b of second inlet members 3010b that generally extend in line or parallel with the rails 3005a and 3005b, respectively. The first row 3009a includes a first proximal end proximate the first rail 3005a and a first distal end, and the second row 3009b includes a second proximal end proximate the second rail 3005b and a second distal end. It is recognized that the first and second rows 3009a and 3009b could extend generally straight in line or parallel with the first and second rails 3005a and 3005b, as shown, or they could extend at angle(s) outward from the first and second rails 3005a and 3005b. Alternatively, the rows could extend from the rails differently. The row(s) could extend along a portion of the emitter or along an entire length of the emitter. At least one row could extend along an entire length of the emitter. In addition, two or more rows could be used, and the two or more rows could have different lengths. If used with an in-seam emitter designs, row(s) are positioned along the side proximate the tape flow path.

The first and second inlet members 3010a and 3010b extend upward from the emitter base 3001 to form first and second inlet gaps 3018a and 3018b, respectively, through which water from the tape flow path enters the emitter flow path. Although an oval profile is shown, the first and second inlet members 3010a and 3010b could have at least one profile selected from the group consisting of round, oval, rectangular, triangular, and compound angular. It is recognized that other suitable profiles could be used. In this example, the first and second inlet gaps 3018a and 3018b are formed by varying configurations of the adjacent inlet members. It is recognized that spacing between the adjacent inlet members, instead of or in addition to varying configurations, could be used to form the inlet gaps. Optionally, the emitter 3000 could include a guide member (not shown).

It is recognized that various configurations of inlet sections, pressure reducing sections, and outlet sections could be used. For example, the base heights (formed by the thickness of the emitter base) could vary in height and the inlet members (pillars) could vary in spacing and/or thickness and/or configuration. Some example configurations are shown in FIGS. 32A, 32B, 32C, 32D, and 32E and these examples are not exhaustive. In these examples, there are different configurations among the sections, and the inlet sections include different configurations. FIG. 32 includes several section view lines illustrating where in the emitter portion the section views shown in FIGS. 32A, 32B, 32C, 32D, and 32E are taken. Generally, Section View A-A is a cross-section in the outlet section showing the base between the rails. Section View B-B is a cross-section in a middle of the pressure reducing section showing the base between the rails. Section View C-C is a cross-section in the pressure reducing section proximate the inlet section showing the base between the rails. Section View D-D is a cross-section in a middle of the inlet section showing the base between the inlet members. Section View E-E is a cross-section in the inlet section proximate its distal end showing the base between the inlet members. Section View F-F is a side view of the inlet section. The scale for Section View F-F differs from Section Views A-A through E-E.

Figure 32A:
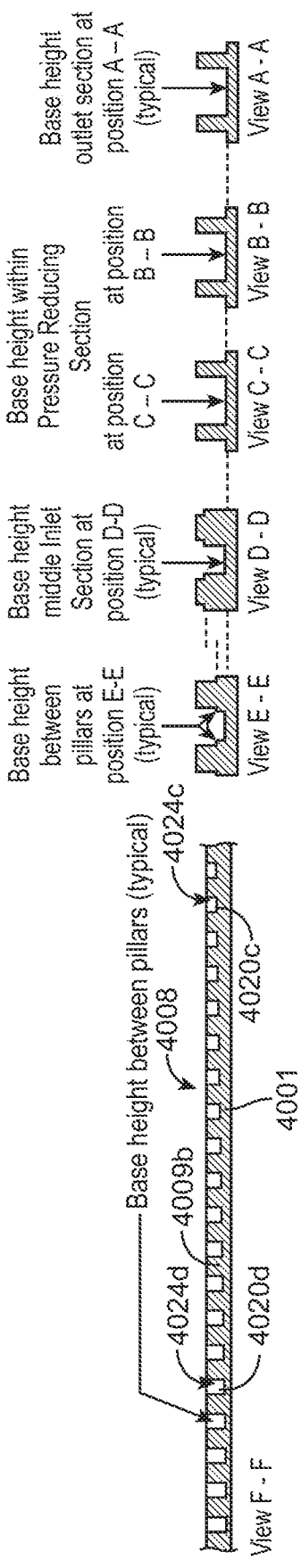
FIG. 32A illustrates cross-section views and a side view of an embodiment of the emitter shown in FIG. 32 taken along the section lines shown in FIG. 32

In one example, shown in FIG. 32A, the base heights and the rail thicknesses are very similar in Section Views A-A, B-B, and C-C. Within the inlet section 4008 (Section View F-F), the base heights vary. Between the rows of inlet members 4009b, a central portion of the base height is similar to the base heights in Section Views A-A, B-B, and C-C. Portions of the base heights on opposing sides, proximate each row of inlet members 4009b, are preferably higher than the central portion and are preferably ramped upward in height from proximate the distal end toward the pressure reducing section, and the inlet members are preferably ramped downward in height from proximate the distal end toward the pressure reducing section. Therefore, the openings proximate the pressure reducing section (e.g., Section View D-D) are smaller than the openings proximate the distal end (e.g., Section View E-E), but a channel 4001a created by the base 4001 between the rows of inlet members 4009b is similar in height proximate the pressure reducing section to the height proximate the distal end. The channel 4001a is a pathway to the pressure reducing section.

Figure 33A:
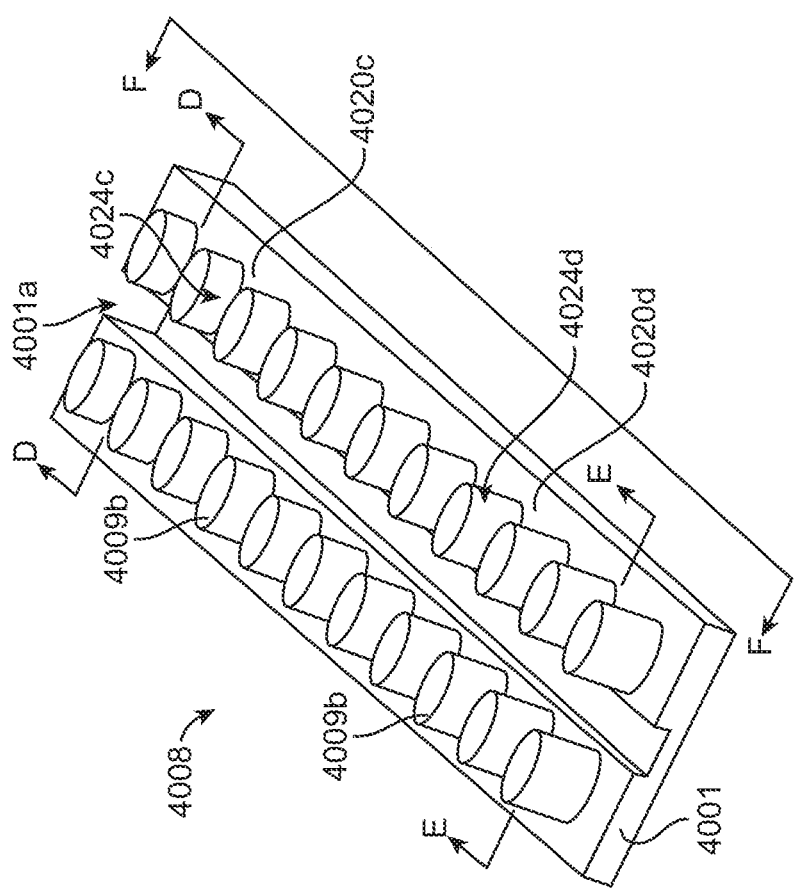
FIG. 33A illustrates a perspective view of a portion of the emitter shown in FIG. 32 corresponding with view F-F in FIG. 32A.

In this example, configurations between the inlet members 4009b vary. For example, a gap floor 4020c (which could be one of one to several) has a height 4024c that is higher proximate the pressure reducing section thereby forming with adjacent inlet members 4009b a relatively small opening, and a gap floor 4020d (which could be one of one to several) has a height 4024d that is lower proximate the distal ends thereby forming with adjacent inlet members 4009b a relatively large opening. This is also shown in FIG. 33A.

Figure 32B:
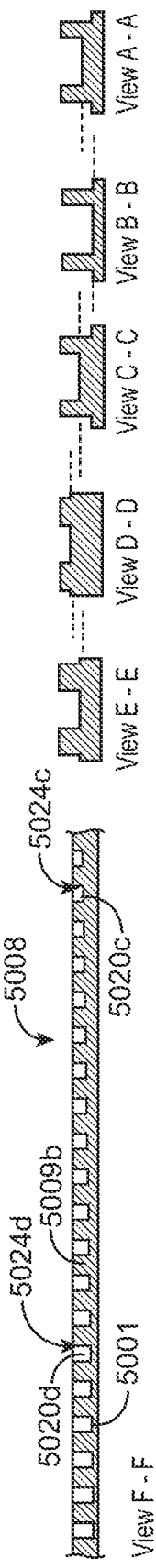
FIG. 32B illustrates cross-section views and a side view of another embodiment of the emitter shown in FIG. 32 taken along the section lines shown in FIG. 32.
Figure 33B:
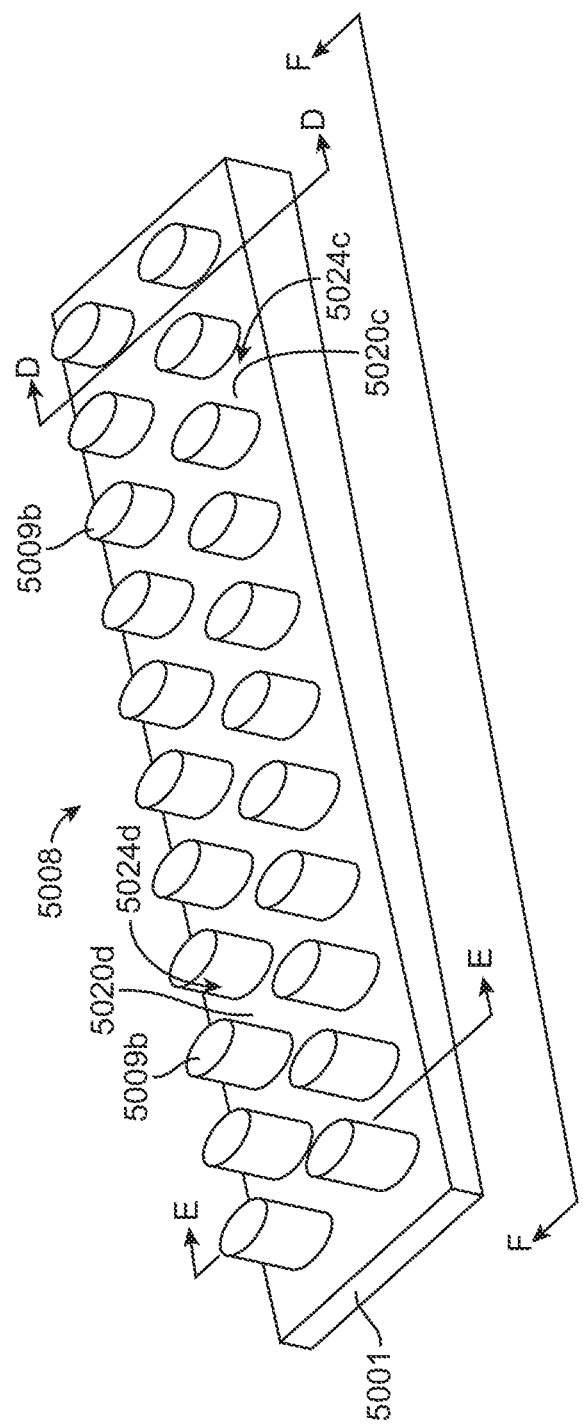
FIG. 33B illustrates a perspective view of a portion of the emitter shown in FIG. 32 corresponding with view F-F in FIG. 32B.

In FIG. 32B, the base heights vary among the sections as shown in Section Views A-A, B-B, C-C, D-D, and E-E. In Section View F-F, the inlet section 5008 includes gap floors formed by the base 5001 that gradually decrease in height from proximate the pressure reducing section (e.g., Section View D-D) to the distal end (e.g., Section View E-E) of the inlet section and, therefore, configurations between the inlet members vary. For example, a gap floor 5020c (which could be one of one to several) has a height 5024c that is higher proximate the pressure reducing section thereby forming with adjacent inlet members 5009b a relatively small opening, and a gap floor 5020d (which could be one of one to several) has a height 5024d that is lower proximate the distal ends thereby forming with adjacent inlet members 5009b a relatively large opening. Preferably, the base heights between the rows of inlet members 5009b are similar to those of adjacent gap floors. This is also shown in FIG. 33B.

Figure 32C:
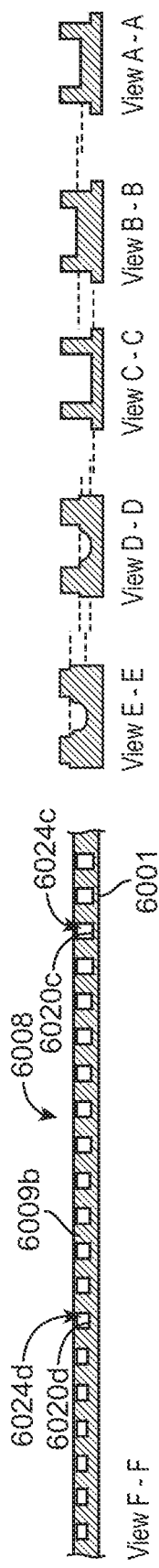
FIG. 32C illustrates cross-section views and a side view of another embodiment of the emitter shown in FIG. 32 taken along the section lines shown in FIG. 32.

In FIG. 32C, the base heights vary among the sections as shown in Section Views A-A, B-B, C-C, D-D, and E-E. Within the inlet section 6008, between the rows of inlet members 6009b, a central portion of the base height is preferably concave. Portions of the base heights on opposing sides, proximate each row of inlet members 6009b, are preferably higher than the central portion and are preferably ramped downward in height from proximate the distal end (e.g., Section View E-E) toward the pressure reducing section (e.g., Section View D-D), and the inlet members are preferably ramped upward in height from proximate the distal end toward the pressure reducing section. Therefore, the openings proximate the pressure reducing section (e.g., Section View D-D) are larger than the openings proximate the distal end (e.g., Section View E-E), but a channel 6001a created by the base 6001 between the rows of inlet members 6009b is shorter proximate the pressure reducing section and taller proximate the distal end. The channel 6001a is a pathway to the pressure reducing section.

Figure 33C:
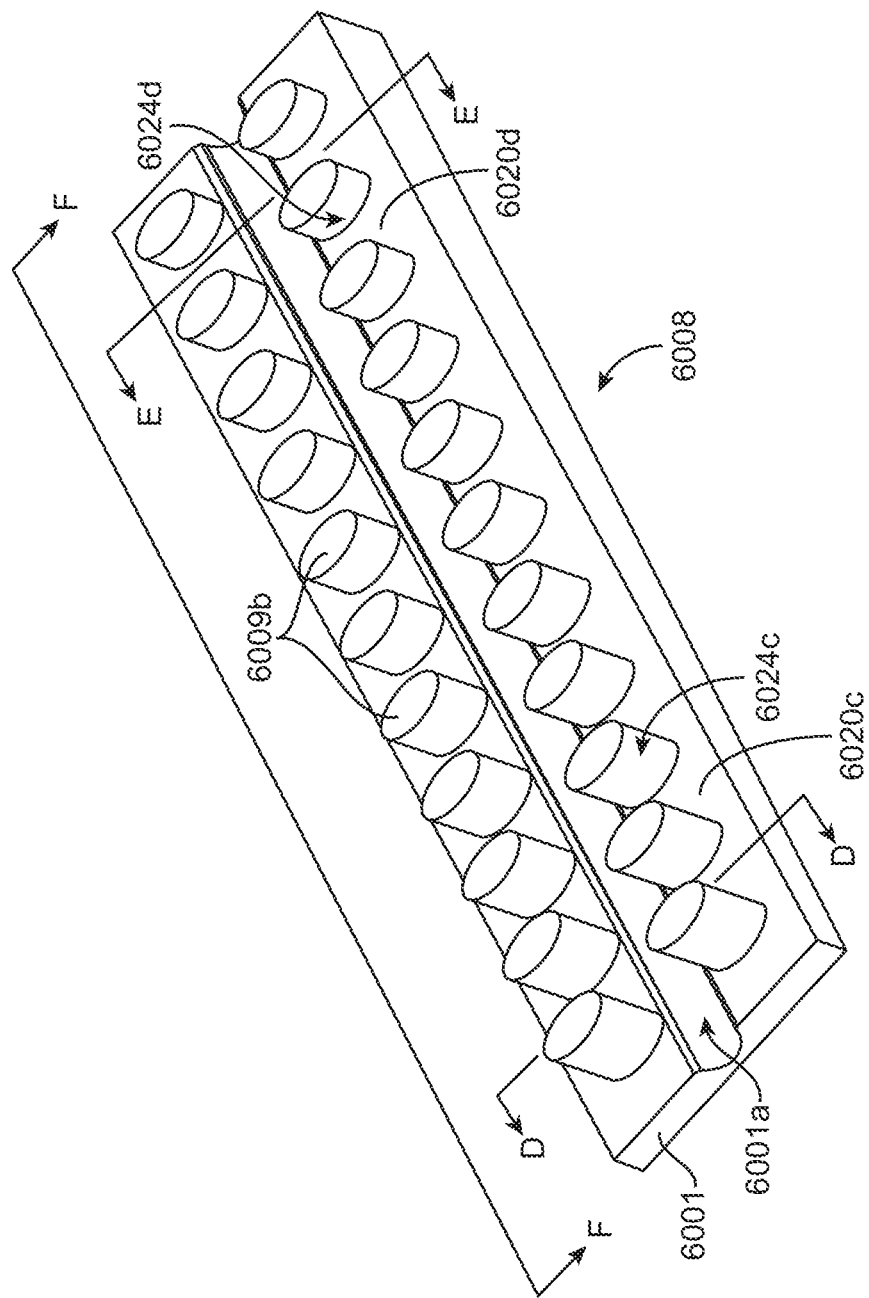
FIG. 33C illustrates a perspective view of a portion of the emitter shown in FIG. 32 corresponding with view F-F in FIG. 32C.

In this example, configurations between the inlet members 6009b vary. For example, a gap floor 6020c (which could be one of one to several) has a height 6024c that is lower proximate the pressure reducing section thereby forming with adjacent inlet members 6009b a relatively large opening, and a gap floor 6020d (which could be one of one to several) has a height 6024d that is higher proximate the distal ends thereby forming with adjacent inlet members 6009b a relatively small opening. This is also shown in FIG. 33C.

Figure 32D:
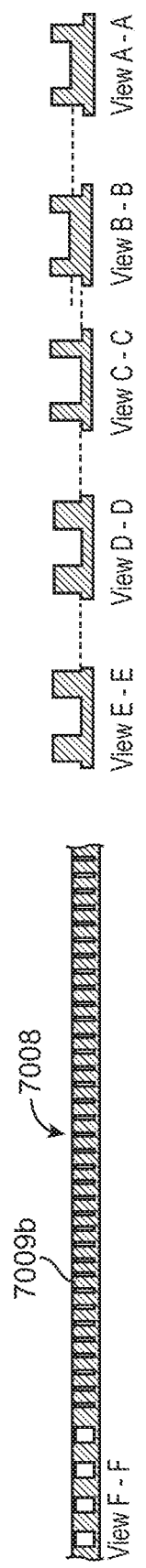
FIG. 32D illustrates cross-section views and a side view of another embodiment of the emitter shown in FIG. 32 taken along the section lines shown in FIG. 32.
Figure 32E:
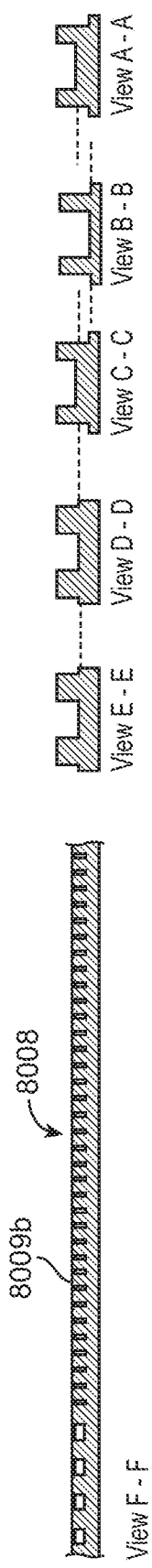
FIG. 32E illustrates cross-section views and a side view of another embodiment of the emitter shown in FIG. 32 taken along the section lines shown in FIG. 32.

In FIGS. 32D and 32E, the base heights vary among the sections as shown in Section Views A-A, B-B, C-C, D-D, and E-E. However, as shown in Section Views D-D and E-E, the base heights could be the same in the inlet sections 7008 and 8008. In Section Views F-F, it is shown that the spacing between the inlet members 7009b and 8009b and the base heights could be the same in the inlet sections 7008 and 8008.

In FIGS. 32A, 32B, 32C, 32D, and 32E, alternatively, the gap floors could be in groups with a number of gap floors one height, a number of gap floors another height, etc. with each group decreasing in height. Also, rather than being generally parallel with the base, the gap floors could be angled to taper the heights. Therefore, inlet opening sizes could not only be formed by spacing between adjacent inlet members but also by gap floor height and/or gap floor angle, or a combination thereof, to vary the fineness of filtration. Also, the base could include a channel between the inlet members, and the channel could be square, concave, V-shaped, or any other suitable shape or configuration.

Generally, the base height can differ in one or more locations in the emitter portion. The base height between the inlet members can match the base height in the middle of the inlet members. The base height between the inlet members can match the base height in the pressure reducing section. The base height in the middle of the inlet section can match the base height in the pressure reducing section. The base height within the pressure reducing section can match the base height in the outlet section. The base height in the middle of the inlet section can be uniform or can vary in height in one or more locations. The base height between the inlet members can be uniform or can vary in height in one or more locations. The base height within the pressure reducing section can be uniform or can vary in height in one or more locations. The base height within the outlet section can be uniform or can vary in height in one or more locations. Any suitable combination of these base heights could also be used.

In another example emitter portion 9000, shown in FIG. 34, includes a guide member 9028 between inlet members 9010a and 9010b. An example of how the emitter portion may be connected to an irrigation hose or tape 9040 is shown in FIG. 35. The emitter portion could have varying configurations. The inlet members could extend beyond, be flush with, and/or be short of an edge formed between the base or floor and the inlet members. The inlet members may be at consistent heights above the base height or may vary in height at one or more locations along the length of an individual inlet member or among groups of inlet members. One or more of the inlet members could be fully touching, be partially touching, or be spaced a desired distance from the inner surface of the wall of the irrigation hose or tape. A guide member could be included and could be at least partially touching or be spaced a desired distance from the inner surface wall of the irrigation hose or tape. At least a portion of the guide member could be fully touching, be partially touching, or be spaced a desired distance from the inner surface of the wall of the irrigation hose or tape. Examples of possible configurations are shown in FIGS. 35A, 35B, and 35C.

In FIG. 35A, the inlet members 10010a and 10010b extend upward and then outward from the base 10001 toward the irrigation hose or tape 9040 forming protrusions 10011a and 10011b and notches 10012a 10012b proximate their outer sides thereby extending the surfaces that may contact the irrigation hose or tape 9040 during use. A guide member 10028 interconnects the base 10001 and the irrigation hose or tape 9040 between the inlet members 10010a and 10010b.

In FIG. 35B, the inlet members 11010a and 11010b extend upward from the base 11001 and interconnect the base 11001 and the irrigation hose or tape 9040. A guide member 11028 interconnects the base 11001 and the irrigation hose or tape 9040 between the inlet members 11010a and 11010b. This is one example of the ends of the inlet members 11010a and 11010b being flush with the outer edges or sides of the base 11001.

In FIG. 35C, the inlet members 12010a and 12010b extend upward from the base 12001 and are preferably inset from the outer sides of the base 12001 thereby forming notches 12012a and 12012b proximate the outer sides. Outer top portions of the inlet members contact the irrigation hose or tape 9040, and inwardly extending protrusions 12011a and 12011b formed by inner top portions of the inlet members do not contact the irrigation hose or tape 9040 but may selectively contact the irrigation hose or tape 9040 during use.

Figure 36:
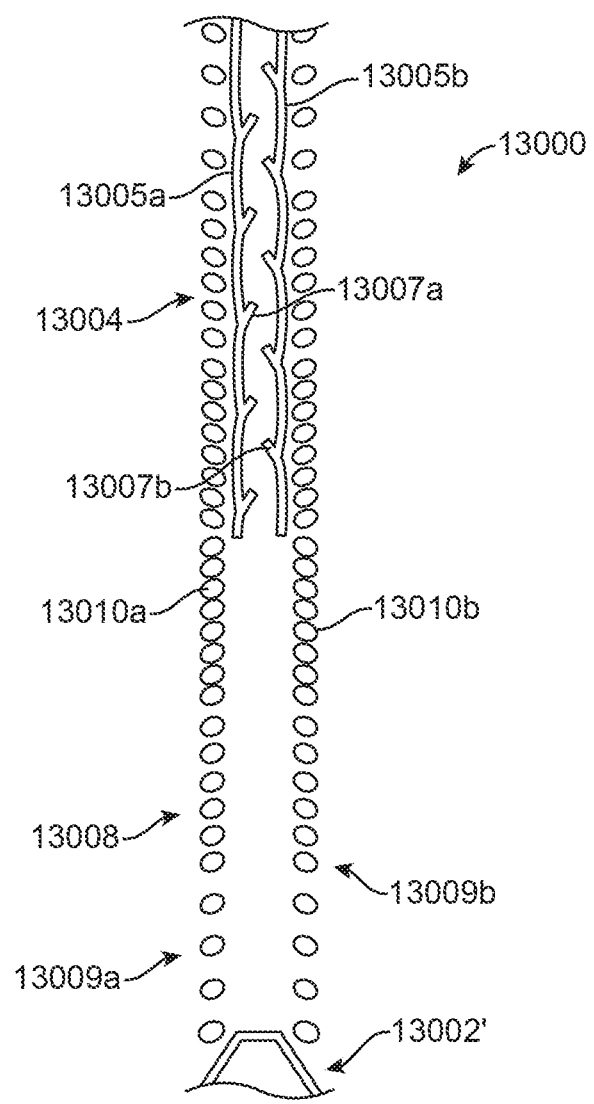
FIG. 36 is a schematic view of a portion of another embodiment emitter constructed in accordance with the principles of the present invention.

In another example emitter portion 13000, shown in FIG. 36, includes rows 13009a and 13009b of inlet members 13010a and 13010b that are spaced more closely together proximate the pressure reducing section 13004 and are gradually spaced further apart as they approach the outlet sections (only outlet section 13002' shown). In this example, the inlet members 13010a and 13010b extend along the inlet section 13008 and the pressure reducing section 13004 to both outlet sections. Optionally, the rails 13005a and 13005b could be nonlinear. For example, the inner surfaces could be concave so that the fluid is directed toward the extensions 13007a and 13007b of the rails as it flows toward the outlet, the extensions being compatible with inlet filtration. For a given inlet and flow combination, the curvature of the rails can be established to create a pattern of flow between extensions, such that settling areas are lessened, and particles capable of passing through the given inlet gaps are propagated downstream through the pressure reducing section and out of the outlet section. Nonlinear rails could be used with other emitter configurations.

FIGS. 37-40 illustrate embodiments with tapering inlet sections including two or more inlet members forming each row. In FIG. 37, a pressure reducing section 3704 interconnects an inlet section 3708 and an outlet section 3702. Outer inlet members 3710a and inner inlet members 3711a are staggered to form a first row 3709a and outer inlet members 3710b and inner inlet members 3711b are staggered to form a second row 3709b in the inlet section 3708. In this example, the outer inlet members have triangular profiles with their vertices inwardly facing and the inner inlet members have circular profiles. The first and second rows 3709a and 3709b are spaced closer together proximate the outlet section 3702' of the adjacent emitter portion and spaced further apart proximate the pressure reducing section 3704 to form a taper T1, as indicated with dashed lines. In so doing, the effective inlet gap is successively larger moving from the inlet members proximate the pressure reducing section toward inlet members proximate the outlet section. This enables sequentially active inlet members ranging from fine to less fine filtration. In addition, the outer inlet members 3710a and 3710b and the inner inlet members 3711a and 3711b are spaced further apart proximate the outlet section 3702' of the adjacent emitter portion for less fine filtration and spaced closer together proximate an opening of the pressure reducing section 3704 for finer filtration.

In FIG. 38, a pressure reducing section 3804 interconnects an inlet section 3808 and an outlet section 3802. Outer inlet members 3810a and inner inlet members 3811a are staggered to form a first row 3809a and outer inlet members 3810b and inner inlet members 3811b are staggered to form a second row 3809b in the inlet section 3808. In this example, the outer inlet members have triangular profiles with their vertices inwardly facing and the inner inlet members have circular profiles. The effective gaps are defined by the relative distances between 3810a and 3811a and between 3810b and 3811b and vary among groups of inlet members. The first and second rows 3809a and 3809b are spaced closer together proximate the outlet section 3802' of the adjacent emitter portion in group G1 and spaced further apart proximate the pressure reducing section 3804 in group G3 with intermediate spacing in group G2 therebetween. In addition, the outer inlet members 3810a and 3810b and the respective adjacent inner inlet members 3811a and 3811b are spaced further apart proximate the outlet section 3802' of the adjacent emitter portion for less fine filtration and spaced closer together proximate an opening of the pressure reducing section 3804 for finer filtration.

In FIG. 39, a pressure reducing section 3904 interconnects an inlet section 3908 and an outlet section 3902. Outer inlet members 3910a and inner inlet members 3911a are staggered to form a first row 3909a and outer inlet members 3910b and inner inlet members 3911b are staggered to form a second row 3909b in the inlet section 3908. In this example, the outer and inner inlet members have triangular profiles with their vertices inwardly facing each other in the row. The effective gaps are defined by the relative distances between 3910a and 3911a and between 3910b and 3911b and vary among groups of inlet members and among inlet members forming a taper. The first and second rows 3909a and 3909b are spaced closer together proximate the outlet section 3902' of the adjacent emitter portion in group G4 and spaced further apart proximate the pressure reducing section 3904 in group G5 with intermediate spacing therebetween forming a taper T2, as indicated with dashed lines. In addition, the outer inlet members 3910a and 3910b and the inner inlet members 3911a and 3911b are spaced further apart proximate the outlet section 3902' of the adjacent emitter portion for less fine filtration and spaced closer together proximate an opening of the pressure reducing section 3904 for finer filtration.

In FIG. 40, a pressure reducing section 4004 interconnects an inlet section 4008 and an outlet section 4002. Outer inlet members 4010a and inner inlet members 4011a are generally aligned with intermediate inlet members 4012a between adjacent outer and inner inlet members 4010a and 4011a to form a first row 4009a and outer inlet members 4010b and inner inlet members 4011b are generally aligned with intermediate inlet members 4012b between adjacent outer and inner inlet members 4010b and 4011b to form a second row 4009b in the inlet section 4008. In this example, the outer and inner inlet members have triangular profiles with their vertices inwardly facing each other in the row and the intermediate inlet members have circular profiles. The first and second rows 4009a and 4009b are spaced closer together proximate the outlet section 4002' of the adjacent emitter portion and spaced further apart proximate the pressure reducing section 4004 to form a taper T3, as indicated with dashed lines. In addition, the outer inlet members 4010a and 4010b and the inner inlet members 4011a and 4011b are spaced further apart proximate the outlet section 4002' of the adjacent emitter portion for less fine filtration and spaced closer together proximate an opening of the pressure reducing section 4004 for finer filtration. In this example, the outer and inner inlet members contact each other and then merge together as they get closer to the pressure reducing section.

Figure 42:
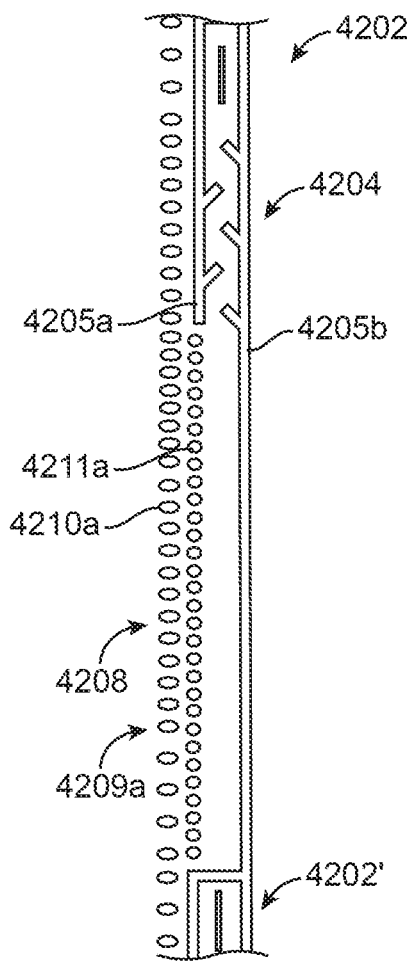
FIG. 42 is a schematic view of a portion of another embodiment emitter constructed in accordance with the principles of the present invention.
Figure 43:
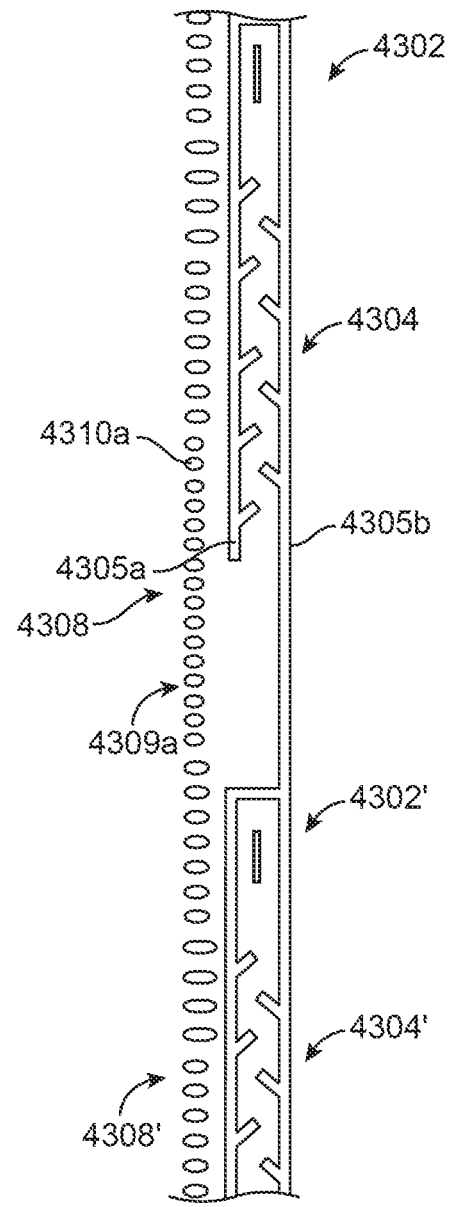
FIG. 43 is a schematic view of a portion of another embodiment emitter constructed in accordance with the principles of the present invention.

FIGS. 41-43 illustrate embodiments with inlet members extending along a length of the emitter portion, effectively extending a portion of the inlet portion along the length of the emitter portion. In FIG. 41, a pressure reducing section 4104 interconnects an inlet section 4108 and an outlet section 4102. In this example, the intervals of adjacent outer inlet members 4110a and 4110b and of adjacent inner inlet member 4111a and 4111b are not fixed. Outer inlet members 4110a and inner inlet members 4111a are staggered to form a first row 4109a and outer inlet members 4110b and inner inlet members 4111b are staggered to form a second row 4109b in the inlet section 4108. In this example, the outer inlet members have triangular profiles with their vertices inwardly facing and the inner inlet members have circular profiles. The first row 4109a extends along the length of the emitter portion, effectively extending the inlet portion along the length of the emitter portion with the pressure reducing section 4104 and the outlet section 4102 positioned along a distal end portion of the first row 4109a of the emitter portion. The outer inlet members 4110a and 4110b and the inner inlet members 4111a and 4111b are spaced further apart proximate the outlet sections 4102 and 4102' for less fine filtration and spaced closer together proximate an opening of the pressure reducing section 4104 for finer filtration.

In FIG. 42, a pressure reducing section 4204 interconnects an inlet section 4208 and an outlet section 4202. Outer inlet members 4210a and inner inlet members 4211a are staggered to form a first row 4209a and, in lieu of a second row of inlet member, a rail 4205b extends along a length of the emitter portion forming part of the emitter sections 4202, 4204, and 4208. In this example, the outer and inner inlet members have oval profiles with differing dimensions. The first row 4209a extends along the length of the emitter portion, effectively extending the inlet portion along the length of the emitter portion with the pressure reducing section 4204 and the outlet section 4202 positioned along a distal end portion of the first row 4209a of the emitter portion. The rails 4205a and 4205b form sides of the pressure reduction section 4204 and outlet section 4202. The outer inlet members 4210a are spaced further apart proximate the outlet sections 4202 and 4202' for less fine filtration and spaced closer together proximate an opening of the pressure reducing section 4204 for finer filtration. As illustrated, inner inlet members 4211a are consistently spaced, however, it is recognized that they could vary in spacing.

In FIG. 43, a pressure reducing section 4304 interconnects an inlet section 4308 and an outlet section 4302. Outer inlet members 4310a form a first row 4309a and, in lieu of a second row of inlet member, a rail 4305b extends along a length of the emitter portion forming part of the emitter sections 4302, 4304, and 4308. In this example, the outer inlet members have oval profiles of varying sizes. The first row 4309a extends along the length of the emitter portion, effectively extending the inlet portion along the length of the emitter portion with the pressure reducing section 4304 and the outlet section 4302 positioned along a distal end portion of the first row 4309a of the emitter portion. The rails 4305a and 4305b form sides of the pressure reduction section 4304 and outlet section 4302. The outer inlet members 4310a are spaced further apart proximate the outlet sections 4302 and 4302' for less fine filtration and spaced closer together proximate an opening of the pressure reducing section 4304 for finer filtration. Proximate a middle section of the pressure reducing section 4304, the outer inlet members 4310a extend closer to the rail 4305a so as to increase resistance in that location compared to the pressure reducing section proximate the input section, so as to further enhance sequential inlet behavior.

Figure 44:
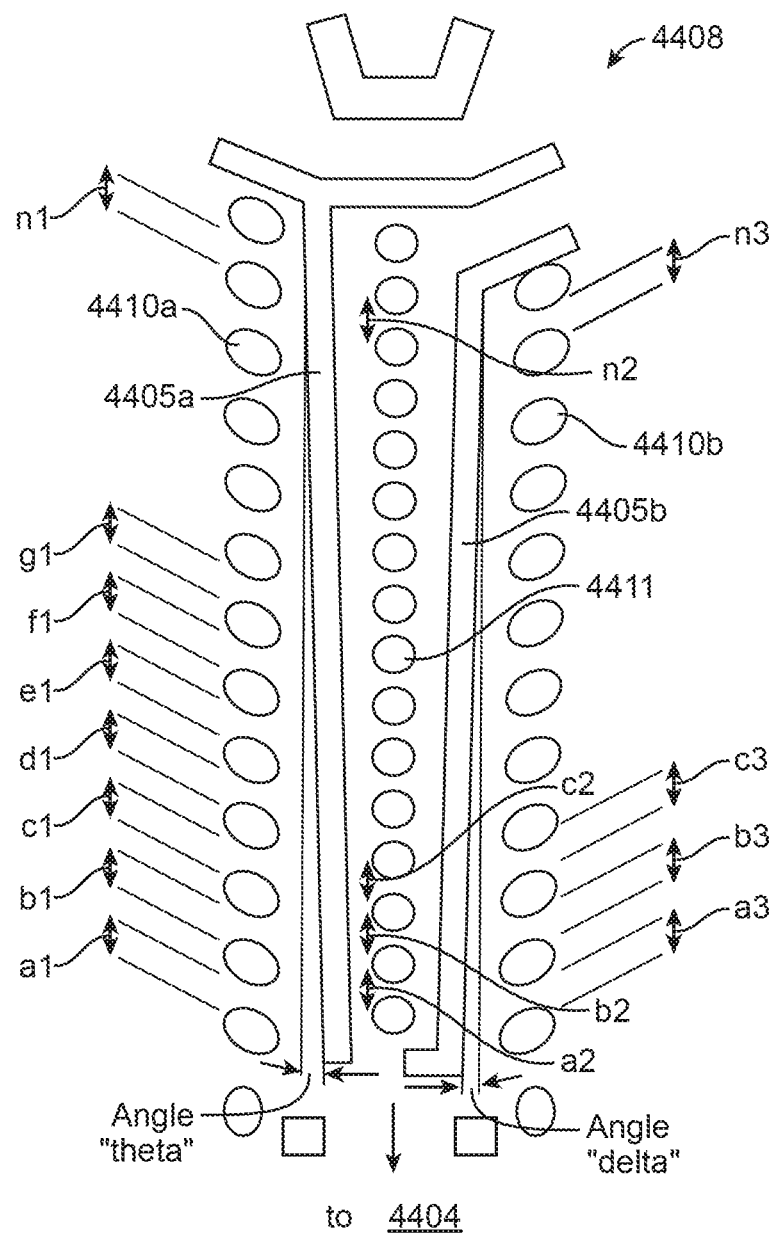
FIG. 44 is a schematic view of an inlet section of another embodiment emitter constructed in accordance with the principles of the present invention.
Figure 45:
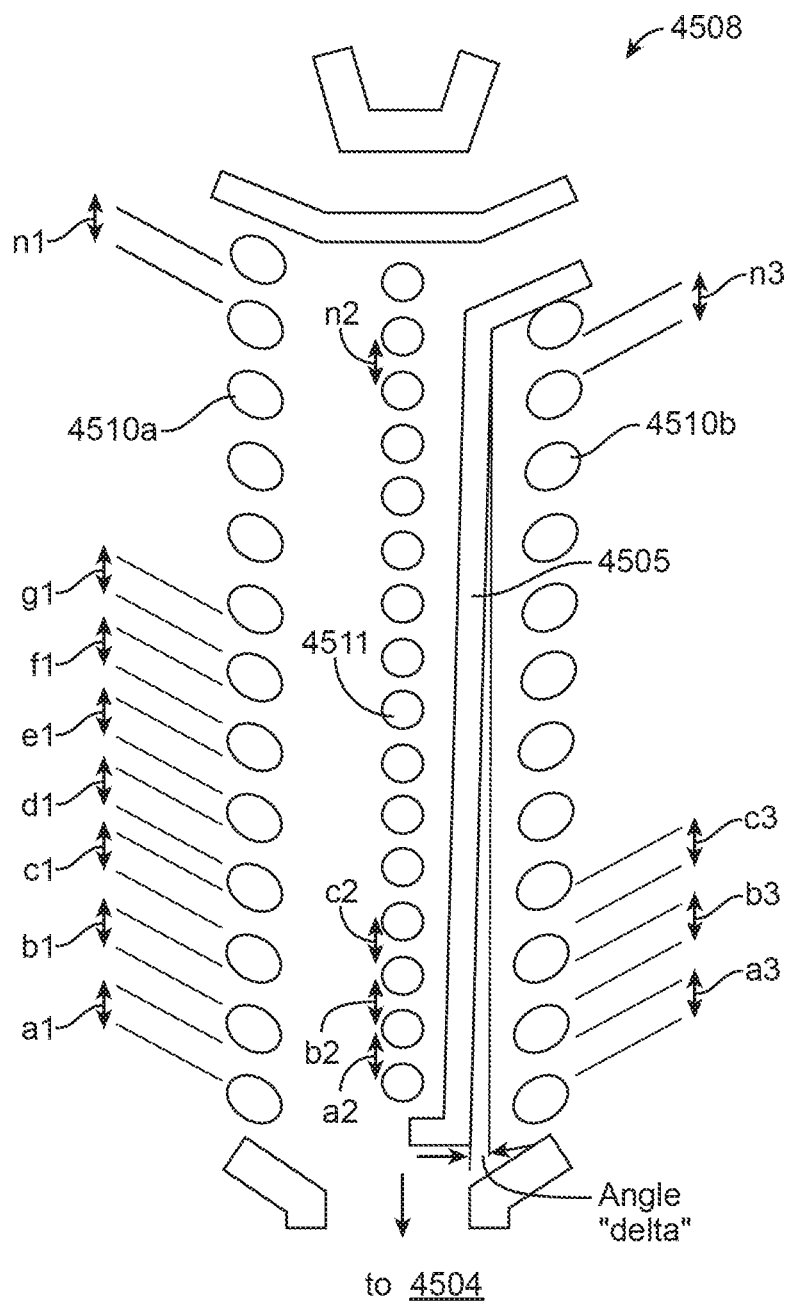
FIG. 45 is a schematic view of an inlet section of another embodiment emitter constructed in accordance with the principles of the present invention.

FIGS. 44 and 45 illustrate embodiments with nested inlet members. In FIG. 44, inlet section 4408 includes inner inlet members 4411 separated from outer inlet members 4410a and 4410b with rails 4405a and 4405b, respectively. These rail portions act as guide members to assist in directing flow into the pressure reducing section 4404. The inlet members are shown with oval and circular profiles, but any suitable profile may be used. Several configurations are shown, and these configurations may be combined in any desired combination including one or more of the configurations. For example, possible configurations are shown in Table 1:

TABLE 1

Example Configurations

| Configurations | Dimensions |
| --- | --- |
| A | $a1 > b1 > c1 \ldots > n1$ |
| B | $a1 < b1 < c1 \ldots < n1$ |
| C | $a1 = b1 = c1 \ldots = n1$ |
| D | $a1 = b1 = c1 > d1 = e1 = f1 > g1 \ldots n1$ |
| E | $a1 = b1 = c1 < d1 = e1 = f1 < g1 \ldots n1$ |

Although example configurations are shown, these are not exhaustive, and it is recognized that consecutive inlet members may be spaced apart differently, and sections of inlet members may have the same spacing that differs from spacing of adjacent sections of inlet members in any suitable manner. The corresponding dimensions n1, n2, n3 may or may not be equal. For example, a1, a2, and a3 could all be the same or at least one could be different. Angle "theta" and Angle "delta" may or may not be equal and the angles could equal 0 degrees. In configurations B and E, it is preferable that Angle "theta" is greater than or equal to 0 degrees.

In FIG. 45, inlet section 4508 includes inner inlet members 4511 extending along a middle portion and outer inlet members 4510a and 4510b extending along opposing sides of the inner inlet members 4511. A rail 4505 is positioned between the inner inlet members 4511 and the outer rail members 4510b as a guide member to assist in directing flow into the pressure reducing section 4504. Although one rail is shown, more than one rail may be used. The inlet members are shown with oval and circular profiles, but any suitable profile may be used. Several configurations are shown, and these configurations may be combined in any desired combination including one or more of the configurations. For example, possible configurations are shown in Table 2:

TABLE 2

Example Configurations

| Configurations | Dimensions |
| --- | --- |
| A | $a_1 > b_1 > c_1 \ldots > n_1$ |
| B | $a_1 < b_1 < c_1 \ldots < n_1$ |
| C | $a_1 = b_1 = c_1 \ldots = n_1$ |
| D | $a_1 = b_1 = c_1 > d_1 = e_1 = f_1 > g_1 \ldots n_1$ |
| E | $a_1 = b_1 = c_1 < d_1 = e_1 = f_1 < g_1 \ldots n_1$ |

Although example configurations are shown, these are not exhaustive, and it is recognized that consecutive inlet members may be spaced apart differently, and sections of inlet members may have the same spacing that differs from spacing of adjacent sections of inlet members in any suitable manner. The corresponding dimensions $n_1$, $n_2$, $n_3$ may or may not be equal. For example, $a_1$, $a_2$, and $a_3$ could all be the same or at least one could be different. Angle "delta" may or may not be equal to 0 degrees. It is preferable that Angle "delta" is greater than or equal to 0 degrees.

Several examples are described and shown, but it is recognized that the various features and configurations could be interchanged and modified to accommodate different, desired results.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. An emitter for use with a drip irrigation tape, the drip irrigation tape having a tape wall, at least a portion of the tape wall defining a tape flow path and a tape outlet, comprising:
    an outlet section in fluid communication with the tape outlet;
    a pressure reducing section in fluid communication with the outlet section;
    an inlet section in fluid communication with the pressure reducing section and the tape flow path, wherein the outlet section, the pressure reducing section, and the inlet section extend from a base toward the tape wall, and wherein the outlet section, the pressure reducing section, the inlet section, the base, and a portion of the tape wall define an emitter flow path;
    the emitter including at least one selected from the group consisting of:
        the inlet section including a plurality of inlet members having a proximal end proximate the pressure reducing section and a distal end, the plurality of inlet members including at least a first plurality of inlet members arranged in a first row and forming at least first and second adjacent inlet gaps between inlet members including at least first and second openings having different sizes, the at least first and second openings being part of the at least first and second adjacent inlet gaps;
        the pressure reducing section including at least first and second pressure reducing portions, the first pressure reducing portion having a first pressure reducing configuration with at least a first resistance feature and the second pressure reducing portion having a second pressure reducing configuration with at least a second resistance feature, the first and second pressure reducing configurations being different;
        the pressure reducing section including a rail portion with at least one nonlinear rail portion along a sidewall of the rail portion;
        a pressure responsive section including at least one nonlinear rail portion; and
        the base including a first base portion and a second base portion, the first base portion having a first base configuration and the second base portion having a second base configuration, the first and second base configurations being different, wherein at least one of the first base portion or the second base portion is positioned in one or more of the inlet section, the pressure reducing section, or the outlet section.

2. The emitter of claim 1, wherein the first openings are proximate the proximal end and the second openings are larger than the first openings.

3. The emitter of claim 1, wherein the first and second openings are defined by at least one selected from the group consisting of:
    first and second spacing, respectively, between adjacent inlet members;
    first and second heights, respectively, between first and second inlet gap floors of the first and second inlet gaps and the tape wall;
    first and second angular relationships of inlet members; and
    first and second configurations of the plurality of inlet members.

4. The emitter of claim 1, further comprising an at least one guide member within at least a portion of the inlet section, wherein the at least one guide member includes at least one configuration selected from the group consisting of straight, angular, compound angular, curvilinear, tapered, is at least partially in contact with an inner wall of the tape wall and at least partially spaced relative to the tape wall.

5. The emitter of claim 4, wherein the plurality of inlet members include inner inlet members and outer inlet members, wherein the at least one guide member is positioned between the inner inlet members and the outer inlet members.

6. The emitter of claim 1, wherein the first row is one of one or more rows formed by the plurality of inlet members extending from proximate the pressure reducing section, wherein at least one portion of the one or more rows is either parallel or at an angle relative to a longitudinal axis of the emitter.

7. The emitter of claim 1, wherein a portion of the plurality of inlet members extends at least partially along at least one of the group consisting of the pressure reducing section and the outlet section.

8. The emitter of claim 1, wherein the base of the inlet section includes configurations varying in height between at least a portion of a central portion between rows of inlet members and at least a portion of a floor gap between inlet members within a row.

9. The emitter of claim 1, wherein at least one of the plurality of inlet members forms a protrusion relative to a side of the base.

10. The emitter of claim 1, wherein at least one of the plurality of inlet members is inset relative to a side of the base.

11. The emitter of claim 1, wherein at least one of the plurality of inlet members is flush with an outer side of the base.

12. The emitter of claim 1, wherein at least one of the plurality of inlet members is at least partially in contact with an inner wall of the tape wall.

13. The emitter of claim 1, wherein at least one of the plurality of inlet members is selectively spaced from an inner wall of the tape wall.

14. The emitter of claim 1, further comprising a plurality of features in the pressure reducing section, one or more of the plurality of features having a configuration selected from the group consisting of angled relative to the at least one rail portion, curved compound angle, linear compound angle, curvilinear angle, angled tip, and angled face.

15. The emitter of claim 14, wherein the plurality of features have one or more from the group consisting of varying configurations, varying intervals between features, and varying dimensions.

16. The emitter of claim 1, further comprising a rail, a portion of the plurality of inlet members having varying distances from inner surfaces of the plurality of inlet members to the rail.

17. The emitter of claim 1, wherein the pressure reducing section includes a rail, at least a portion of the rail being angled relative to a longitudinal axis of the emitter.

18. The emitter of claim 1, wherein at least one of the plurality of inlet members differs in angular orientation relative to a longitudinal axis of the emitter.

19. The emitter of claim 1, wherein the plurality of inlet members includes a second plurality of inlet members arranged in a second row and forming at least third and fourth adjacent inlet gaps between inlet members including at least third and fourth openings having different sizes.

20. The emitter of claim 19, wherein the first and third openings are proximate the proximal end and the second and fourth openings are proximate the distal end, the first opening being different than the second opening, the third opening being different than the fourth opening.

21. The emitter of claim 19, wherein at least a portion of one of the first row or the second row extends in a line parallel with at least a portion of a rail of the pressure reducing section.

22. The emitter of claim 1, wherein the first and second base configurations are at least one of first and second base heights or first and second base cross-sections.

23. The emitter of claim 1, wherein the emitter is assembled as part of the drip irrigation tape, the tape wall including a perimeter selected from the group consisting of a continuous perimeter and a discontinuous perimeter formed by seaming the tape wall in at least one location of the perimeter.

* * * * *